(12) United States Patent
Folke et al.

(10) Patent No.: US 9,591,666 B2
(45) Date of Patent: Mar. 7, 2017

(54) METHODS AND NODES FOR DETECTING ACTIVATION OF SERVING CELL

(71) Applicant: Telefonaktiebolaget L M Ericsson (publ), Stockholm (SE)

(72) Inventors: Mats Folke, Luleå (SE); Muhammad Kazmi, Bromma (SE); Mattias Bergström, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 77 days.

(21) Appl. No.: 14/650,623

(22) PCT Filed: Jan. 16, 2014

(86) PCT No.: PCT/SE2014/050039
§ 371 (c)(1),
(2) Date: Jun. 9, 2015

(87) PCT Pub. No.: WO2014/112936
PCT Pub. Date: Jul. 24, 2014

(65) Prior Publication Data
US 2015/0319778 A1    Nov. 5, 2015

Related U.S. Application Data

(60) Provisional application No. 61/754,285, filed on Jan. 18, 2013.

(51) Int. Cl.
*H04W 74/00* (2009.01)
*H04W 28/08* (2009.01)
(Continued)

(52) U.S. Cl.
CPC ........ *H04W 74/002* (2013.01); *H04L 5/001* (2013.01); *H04L 5/0098* (2013.01);
(Continued)

(58) Field of Classification Search
CPC .... H04W 76/021; H04W 88/00; H04W 88/02
See application file for complete search history.

(56) References Cited

U.S. PATENT DOCUMENTS

| 2012/0076105 A1 | 3/2012 | Yang et al. |
| 2012/0213207 A1* | 8/2012 | Jang ............... H04W 24/10 370/336 |

(Continued)

FOREIGN PATENT DOCUMENTS

| CN | 102624494 A | 8/2012 |
| EP | 2360864 A1 | 8/2011 |

OTHER PUBLICATIONS

3rd Generation Partnership Rpoject, "3rd Generation Partnership Project; Technical Specification Group Radio Access Network; Evolved Universal Terrestrial Radio Access (E-UTRA); Medium Access Control (MAC) protocol specification (Release 11)", Technical Specification, 3GPP TS 36.321 V11.0.0, Sep. 1, 2012, pp. 1-55, 3GPP, France.

(Continued)

*Primary Examiner* — Warner Wong
(74) *Attorney, Agent, or Firm* — Coats & Bennett, PLLC

(57) ABSTRACT

The invention relates to a method for detecting that an additional serving cell is activated is provided. The method is implemented by a wireless device and a network node of a system supporting carrier aggregation. The network node serves the wireless device configured with a first serving cell and the additional serving cell. The network node method comprises configuring (710) the wireless device to transmit feedback information associated with the additional serving cell at a first rate, and transmitting (520) a command to the wireless device to activate the additional serving cell. The method also comprises detecting (530) the activation of the additional serving cell based on reception of feedback information from the wireless device, and configuring (540)

(Continued)

the wireless device to transmit feedback information associated with the additional serving cell at a second rate after activation, where the second rate is lower than the first rate.

30 Claims, 10 Drawing Sheets

(51) Int. Cl.
| | |
|---|---|
| H04W 72/02 | (2009.01) |
| H04W 76/02 | (2009.01) |
| H04L 5/00 | (2006.01) |
| H04W 48/20 | (2009.01) |
| H04W 88/02 | (2009.01) |
| H04W 88/08 | (2009.01) |
| H04W 16/00 | (2009.01) |

(52) U.S. Cl.
CPC ......... *H04W 28/085* (2013.01); *H04W 48/20* (2013.01); *H04W 72/02* (2013.01); *H04W 76/021* (2013.01); *H04W 16/00* (2013.01); *H04W 88/02* (2013.01); *H04W 88/08* (2013.01)

(56) References Cited

U.S. PATENT DOCUMENTS

| | | | |
|---|---|---|---|
| 2012/0214540 A1* | 8/2012 | Narasimha | H04W 36/30 455/525 |
| 2013/0039294 A1* | 2/2013 | Wang | H04W 74/0833 370/329 |
| 2014/0050206 A1* | 2/2014 | Seo | H04J 11/0069 370/336 |
| 2015/0223052 A1* | 8/2015 | Rosa | H04L 5/001 455/419 |

OTHER PUBLICATIONS

Huawei, et al., "Triggering and transmission of aperiodic CSI reports", 3GPP TSG RAN WG4 Meeting #63, Jacksonville, USA, Nov. 15, 2010, pp. 1-7, R1-105838, 3GPP.

Intel Corporation, "Discussion on SCell activation time in CA", GPP TSG RAN WG4 Meeting #64-Bis, Santa Rosa, USA, Oct. 8, 2012, pp. 1-3, R1-125651, 3GPP.

* cited by examiner

METHODS AND NODES FOR DETECTING ACTIVATION OF SERVING CELL

TECHNICAL FIELD

The disclosure relates to carrier aggregation in a wireless communication system and more specifically to a wireless device, a network node and methods for detecting that an additional serving cell is activated.

BACKGROUND

The Universal Mobile Telecommunication System (UMTS) is one of the 3G mobile communication technologies designed to succeed GSM. 3GPP Long Term Evolution (LTE) is the fourth-generation mobile communication technologies standard developed within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a User Equipment (UE) is wirelessly connected to a Radio Base Station (RBS) commonly referred to as an evolved NodeB (eNodeB or eNB). An RBS is a general term for a radio network node capable of transmitting radio signals to a UE and receiving signals transmitted by a UE. In LTE, the eNodeB manages the radio resources in the cells, and is directly connected to the Core Network (CN), as well as to neighboring eNodeBs via an X2 interface.

FIG. 1 illustrates a typical E-UTRAN comprising a UE 150 wirelessly connected to a serving eNodeB 110a. The serving eNodeB 110a is also connected to neighbouring eNodeBs 110b and 110c, via the X2 interface.

LTE Overview

LTE uses Orthogonal Frequency Division Multiplexing (OFDM) in the downlink (DL) and Discrete Fourier Transform (DFT)-spread OFDM in the uplink (UL). The basic LTE DL physical resource can thus be seen as a time-frequency grid 50 as illustrated in FIG. 2a, where each resource element 210 corresponds to one OFDM subcarrier 220 during one OFDM symbol interval 230.

In the time domain, LTE DL transmissions are organized into radio frames of 10 ms, each radio frame 270 consisting of ten equally-sized subframes 250 with a length of 1 ms (see FIG. 2b). Furthermore, the resource allocation in LTE is typically described in terms of resource blocks (RB), where a RB corresponds to one slot (0.5 ms) in the time domain—a time slot 260—and 12 contiguous subcarriers in the frequency domain. A pair of two adjacent RB in time direction (1 ms) is known as a RB pair. RBs are numbered in the frequency domain, starting with 0 from one end of the system bandwidth.

The notion of Virtual RBs (VRB) and Physical RBs (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRBs are also placed as consecutive PRBs in the frequency domain. On the other hand, the distributed VRBs are not mapped to consecutive PRBs in the frequency domain, thereby providing frequency diversity for data channel transmitted using these distributed VRBs.

DL transmissions are dynamically scheduled, i.e., in each subframe 250 the RBS transmits control information about to which terminals data is transmitted and upon which RBs the data is transmitted in the current DL subframe. This control signaling is typically transmitted in the first or in the two, three or four first OFDM symbols 230 in each subframe 250. The number n=1, 2, 3 or 4 indicates the number of OFDM symbols used for control signaling and is known as the Control Format Indicator (CFI). The DL subframe 250 also contains common reference symbols (CRS), which are known to the receiver and used for coherent demodulation of e.g. the control information. A DL subframe 250 with CFI=3, i.e. three OFDM symbols 280 used for control, is illustrated in FIG. 2c.

Carrier Aggregation

The LTE Rel-10 specifications have been standardized, supporting Component Carrier (CC) bandwidths up to 20 MHz, which is the maximal LTE Rel-8 carrier bandwidth. An LTE Rel-10 operation wider than 20 MHz is possible and appear as a number of LTE CCs to an LTE Rel-10 terminal. The straightforward way to obtain bandwidths wider than 20 MHz is by means of Carrier Aggregation (CA). CA implies that an LTE Rel-10 terminal can receive multiple CC, where the CC may have the same structure as a Rel-8 carrier. CA is illustrated in FIG. 2d, where five CC of 20 MHz, 295, are aggregated to a total bandwidth of 100 MHz, 290. The Rel-10 standard support up to 5 aggregated CCs 295 where each CC is limited in the radio frequency specifications to have one out of six bandwidths, namely 6, 15, 25, 50, 75 or 100 RB corresponding to 1.4, 3, 5, 10, 15, and 20 MHz respectively.

The number of aggregated CCs 295 as well as the bandwidth of the individual CCs may be different for UL and DL. A symmetric configuration refers to the case where the number of CCs in DL and UL is the same whereas an asymmetric configuration refers to the case that the number of CCs is different in DL and UL. It is important to note that the number of CCs configured in the network may be different from the number of CCs seen by a terminal. A terminal may for example support more DL CCs than UL CCs, even though the network offers the same number of UL and DL CCs.

CCs are also referred to as cells or serving cells. More specifically, in an LTE network the cells aggregated by a terminal are denoted primary Serving Cell (PCell) and secondary Serving Cells (SCells). The term serving cell comprises both PCell and SCells. All UEs have one PCell and the choice of a UEs PCell is terminal specific. The PCell is considered more important, i.e., vital control signaling and other important signaling is typically handled via the PCell. UL control signaling is always sent on a UEs PCell. The CC configured as the PCell is the primary CC whereas all other CCs are SCells.

During initial access a LTE Rel-10 terminal behaves similar to a LTE Rel-8 terminal. However, upon successful connection to the network a Rel-10 terminal may—depending on its own capabilities and on the network—be configured with additional serving cells in the UL and DL. Configuration is based on Radio Resource Control (RRC). Due to the heavy signaling and rather slow speed of RRC signaling it is envisioned that a terminal may be configured with multiple serving cells even though not all of them are currently used.

SCell Activation and Deactivation

With the concept of SCells, additional bandwidth resources could be configured and deconfigured dynamically. The configuration and deconfiguration of cells are signaled by the eNodeB and performed with RRC signaling which is heavy signaling and slow. Since RRC signaling is heavy and slow the concept of activation and deactivation was introduced for SCells. The eNodeB has the possibility to deactivate a UE's serving cells. The eNodeB decides to deactivate serving cells that the UE should not use for the moment. Activation and deactivation is performed with Medium Access Control (MAC) signaling which is faster. The activation and deactivation procedure is described in detail in section 5.13 of 3GPP TS 36.321; Medium Access Control (MAC) protocol specification, V11.0.0 (2012-09). Each SCell is configured with a SCellIndex, which is an identifier or a so called Cell Index which is unique among all serving cells configured for this UE. The PCell always have Cell Index 0 and SCells can have an integer cell index of 1 to 7.

The Rel-10 Activation/Deactivation MAC Control Element (CE) is defined in section 6.1.3.8 of 3GPP TS 36.321. The Activation/Deactivation MAC CE consists of a single octet containing seven C-fields and one R-field. Each C-field corresponds to a specific SCellIndex and indicates whether the specific SCell is activated or deactivated. The UE will ignore all C-fields associated with Cell indices not being configured. The Activation/Deactivation MAC CE always indicates the activation status of all configured SCells, meaning that if the eNodeB wants to activate one SCell it has to include all configured SCells, setting them to activated or deactivated even if their status has not changed.

If a UE's serving cell is activated it would imply that the UE has to monitor PDCCH and PDSCH for that serving cell. This implies e.g. a wider receiver bandwidth and higher sampling rates resulting in high power consumption compared to if that serving cell would have been deactivated.

Sounding Reference Signal Transmissions

In LTE the serving eNodeB can configure a UE to transmit Sounding Reference Signals (SRS) in the UL. The SRS is a physical signal and more specifically it is a type of reference signal.

The aim of SRS is to enable the eNodeB to determine the UL channel status or radio link quality in the frequency domain. The SRS may also be used for performing certain type of UE and eNodeB radio measurements, e.g. for UL positioning measurements such as UE Rx-Tx time difference, eNodeB Rx-Tx time difference, Timing Advance (TA), and angle of arrival (AoA).

The SRS is transmitted periodically in the time domain. The subframes used for SRS transmission in time domain and their bandwidths are semi-statically configured using RRC signaling. The SRS are transmitted in the last Single Carrier Frequency Division Multiple Access (SC-FDMA) symbol of a subframe when configured for SRS transmissions. In the frequency domain SRS can be of different bandwidths according to their semi-static configurations.

Channel State Information Reporting

The UE performs and report channel state information (CSI) measurements for all the serving cells including PCell and SCell(s) to the network node to facilitate e.g. DL scheduling, link adaptation, and antenna mode selection performed by the network. In LTE, CSI measurements comprises:

Rank indication (RI): RI is used to indicate recommended number of layers for DL transmission using DL multi antenna scheme.

Precoder matrix indication (PMI): PMI indicates the recommended precoder matrix that must be used for DL transmission.

Channel quality indication (CQI): CQI indicates the highest modulation and coding (MCS) scheme or transport format that can be used for DL transmission.

The CSI measurements and reporting are configured at the UE by its serving node. In LTE the network node (e.g. eNodeB) can configure the UE to report CSI using periodic and/or aperiodic mechanisms. The periodicity is also configured by the network. The CSI measurements can be sent by the UE to the eNodeB on a control channel such as Physical UL Control Channel (PUCCH), or on a data channel such as Physical UL Shared Channel (PUSCH). In case of multi-carrier the CSI feedback information for SCell is also sent on the UL PCell.

The UE sends valid feedback information such as valid CQI associated with the activated SCell only when the SCell is activated. This feedback information may be used by the network to determine when exactly the SCell is activated. The network may start scheduling the data on the SCell as soon as it is activated. However the exact activation time is uncertain since it depends upon the level of UE synchronization with the deactivated SCell. Upon reception of the SCell activation command from the network, the UE may take between 8 ms to 34 ms to activate the deactivated SCell.

Therefore in existing solutions, the eNodeB may need to wait before using the new SCell until the complete activation time has passed, e.g. up to 34 ms. This may therefore lead to significant performance degradation as it e.g. creates an unnecessary interruption in communication in cases when the UE can actually activate the SCell much faster than in 34 ms. In addition to reduced performance, it may also cause buffer overflow and wastage of resources as they cannot be assigned.

SUMMARY

It is therefore an object to address at least some of the problems addressed above, and to overcome the performance degradation due to the uncertainty in the SCell activation time.

In accordance with a first aspect, a method for detecting that an additional serving cell is activated is provided. The method is implemented by a network node of a wireless communication system supporting carrier aggregation. The network node serves a wireless device configured with a first serving cell and the additional serving cell. The method comprises configuring the wireless device to transmit feedback information associated with the additional serving cell at a first rate, and transmitting a command to the wireless device to activate the additional serving cell. The method also comprises detecting the activation of the additional serving cell based on reception of feedback information from the wireless device, and configuring the wireless device to transmit feedback information associated with the additional serving cell at a second rate after activation of the additional serving cell. The second rate is lower than the first rate.

In accordance with a second aspect, a method implemented by a wireless device supporting carrier aggregation and configured with a first serving cell and an additional serving cell is provided. The method is for enabling detection of activation of the additional serving cell by a network node serving the wireless device. The method comprises receiving a command from the network node to activate the additional serving cell. In response to the received command, the method comprises adjusting a rate for transmitting feedback information associated with the additional serving cell to a first rate, and activating the additional serving cell.

The method also comprises adjusting the rate for transmitting feedback information associated with the additional serving cell to a second rate, after activating the additional serving cell. The second rate is lower than the first rate.

In accordance with a third aspect, a network node of a wireless communication system is provided, for detecting that an additional serving cell is activated. The network node is configured to support carrier aggregation and to serve a wireless device configured with a first serving cell and the additional serving cell. The network node comprises a transceiver and processing means adapted to configure the wireless device to transmit feedback information associated with the additional serving cell at a first rate. The processing means is also adapted to transmit via the transceiver a command to the wireless device to activate the additional serving cell, and to detect the activation of the additional serving cell based on reception of feedback information from the wireless device. Furthermore, the processing means is adapted to configure the wireless device to transmit feedback information associated with the additional serving cell at a second rate after activation of the additional serving cell. The second rate is lower than the first rate.

In accordance with a fourth aspect, a wireless device for enabling detection of activation of an additional serving cell by a network node serving the wireless device is provided. The wireless device is configured to support carrier aggregation. The wireless device is configured with a first serving cell and the additional serving cell. The wireless device comprises a transceiver and processing means adapted to receive a command from the network node via the transceiver to activate the additional serving cell. In response to the received command, the processing means is adapted to adjust a rate for transmitting feedback information associated with the additional serving cell to a first rate, and to activate the additional serving cell. The processing means is also adapted to adjust the rate for transmitting feedback information associated with the additional serving cell to a second rate, after activating the additional serving cell. The second rate is lower than the first rate.

An advantage of embodiments is that the network node may start using the additional serving cell sooner after activation, which in turn improves performance.

A further advantage of embodiments is that the network node does not have to configure the feedback reporting rate of the wireless device to be high all the time. This reduces signaling overhead in UL, lowers overall UL interference, and improves overall performance.

Other objects, advantages and features of embodiments will be explained in the following detailed description when considered in conjunction with the accompanying drawings and claims.

DETAILED DESCRIPTION

Figure 1:
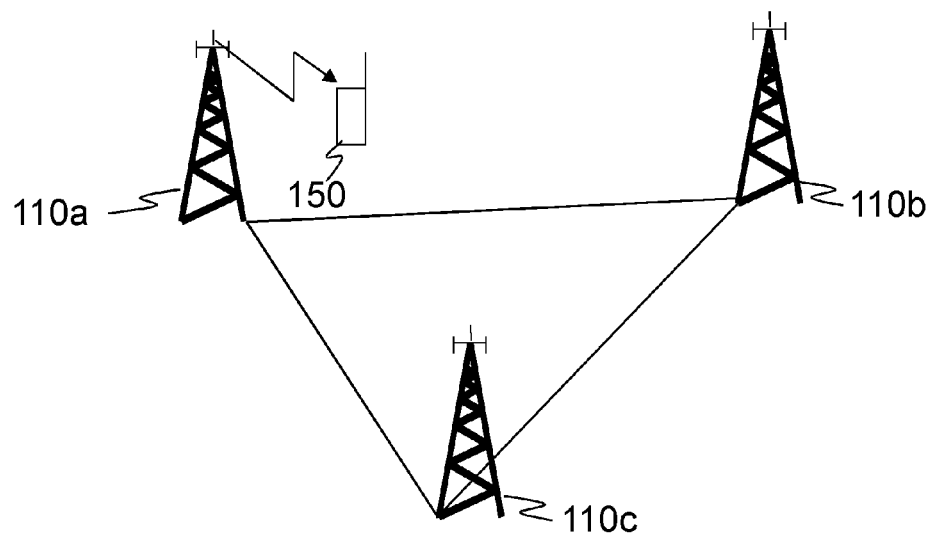
FIG. 1 illustrates schematically an E-UTRAN.
Figure 2A:
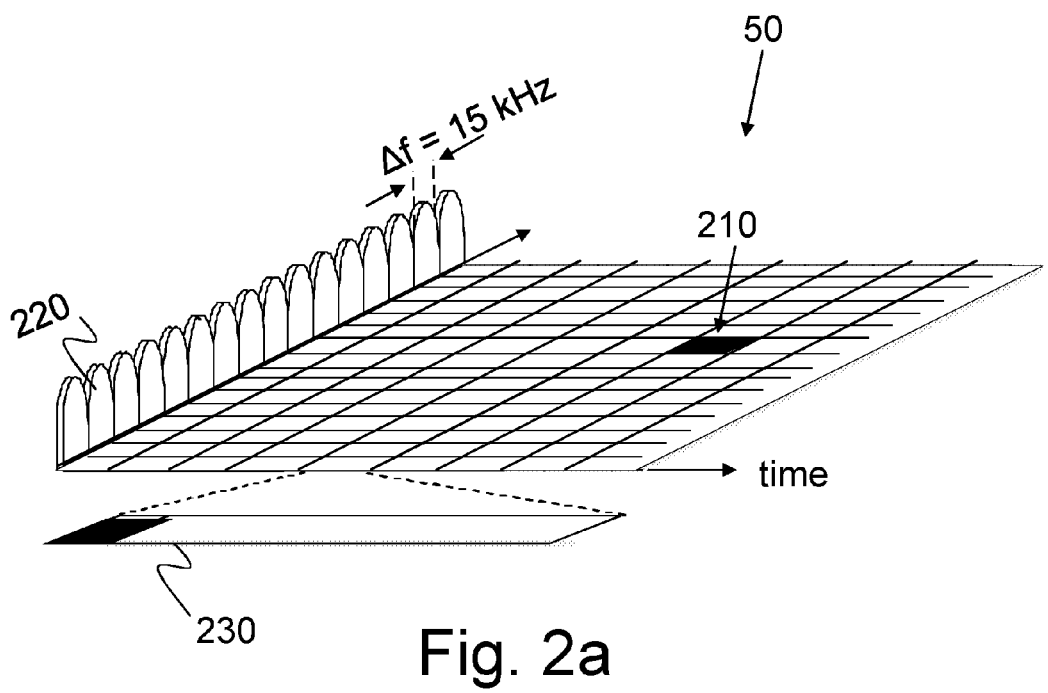
FIG. 2a illustrates schematically the LTE DL physical resource
Figure 2B:
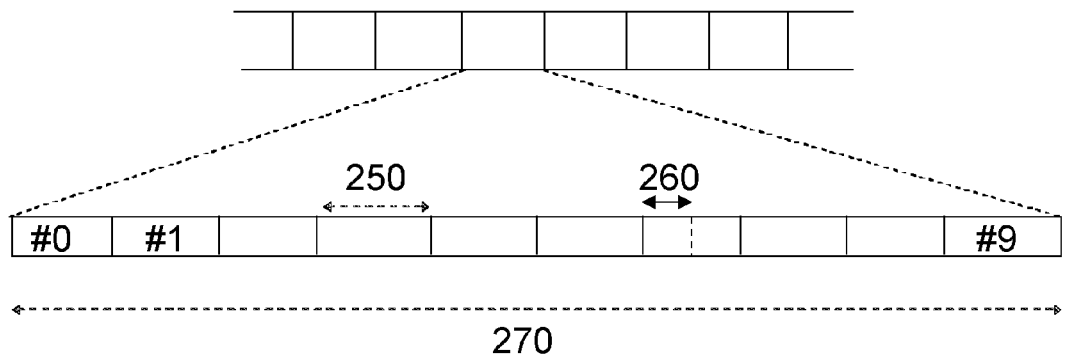
FIG. 2b illustrates schematically the LTE time-domain structure
Figure 2C:
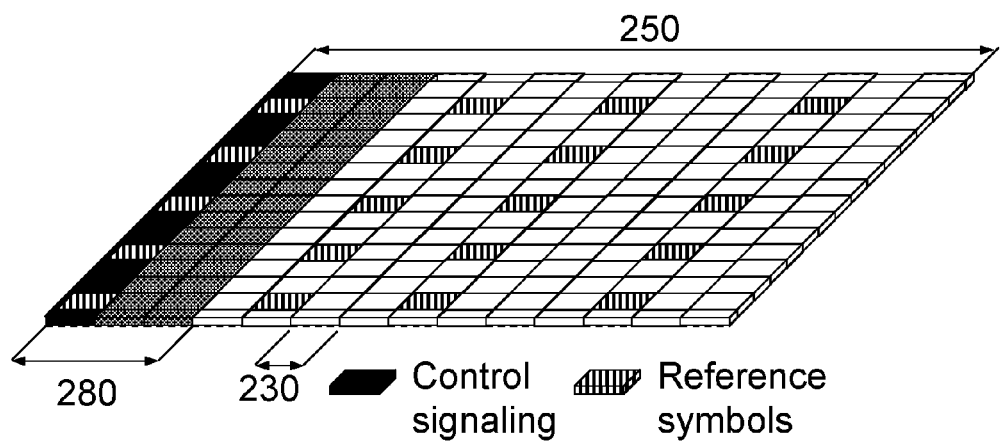
FIG. 2c illustrates schematically a DL system in LTE.
Figure 2D:
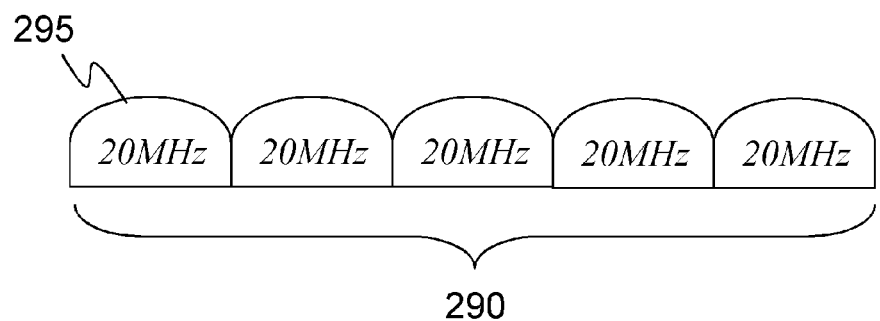
FIG. 2d illustrates schematically the CA concept.

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of a method and a node, they may also be embodied in a computer program product as well as in a system comprising a computer processor and a memory coupled to the processor, wherein the memory is encoded with one or more programs that may perform the functions disclosed herein.

Embodiments are hereinafter described in a non-limiting general context in relation to an example scenario of CA in E-UTRAN, with activation of an SCell as the additional serving cell. As 3GPP LTE has been used as an example of a wireless communication system and radio access technology, a UE and an eNodeB have been used as examples of wireless devices and network nodes respectively. However, it should be noted that the embodiments may be applied to other types of wireless communication systems supporting multiple serving cells. When it is said that the eNodeB configures a UE with a configuration, e.g. UE feedback, it may be so that that the decision of which configuration a UE shall use is not done in the eNodeB. Such a decision may be done in another network node, although the eNodeB is the network node which sends the configuration to the terminal.

In some embodiments the non-limiting term radio network node is more commonly used and it refers to any type of network node serving a UE or other wireless device and/or any type of network node connected to another network node or network element. Examples of radio network nodes are a base station (BS), an eNodeB, a network controller, a radio network controller, a base station controller, a relay, a donor node controlling relay, a base transceiver station (BTS), or an access point (AP). In some embodiments the non-limiting term UE is used and it refers to any type of wireless device communicating with a radio network node in a cellular or mobile communication system. Examples of a UE are a target device, a device to device UE, a machine type UE or a UE capable of machine to machine communication, a personal digital assistant (PDA), an iPAD, a tablet, mobile terminals, a smart phone, a laptop embedded equipped (LEE), a laptop mounted equipment (LME), and USB dongles.

A configured SCell is deactivated by default. Therefore the eNodeB has to activate the SCell at least once. Furthermore an activated SCell can be deactivated, activated again and so on. However the SCell activation delay which is the time required by the UE to activated the SCell varies between 8 to 34 ms depending upon several factors such as level of the UE synchronization to the SCell. In some scenarios the UE may be able to activate the SCell in much shorter time compared to the worst case delay which is currently 34 ms. However due to the uncertainty in the activation delay the eNodeB will have to wait until the maximum possible delay (e.g. 34 ms) to start data scheduling on the SCell. This leads to considerable loss in performance and increases latency in starting transmissions on the SCell. The problem of the uncertainty of the SCell activation time is addressed by enabling the eNodeB to quickly detect when the UE has activated the new SCell.

The current disclosure describes several embodiments for reconfiguring or adapting parameters for UE feedback such as CSI feedback and SRS transmissions before and after SCell activation with the purpose to trigger rapid UE feedback after the UE has activated the new SCell. This means that the eNodeB gets a quicker response when the UE has completed SCell activation.

The embodiments described hereinafter comprise both a method in a radio network node or in any network node, and a method in a UE or in any wireless device.

The method in the radio network node serving the UE, where the UE is configured with at least one SCell, may comprise the steps of:

Configuring the UE to send one or more types of feedback information to the radio network node with the first reporting rate, wherein the UE feedback information is associated with the reception of signals on the said configured and deactivated SCell.

Activating the SCell from the deactivation to an activation state.

Determining upon the reception of the feedback information sent by the UE according to the first reporting rate that the said SCell is activated.

Reconfiguring the UE to send the one or more types of feedback information with the second reporting rate. The UE feedback information is also associated with the reception of signals on the activated SCell. The first reporting rate is higher than the second reporting rate.

The above method in the radio network node may be applied whenever the SCell is activated or it may be applied selectively provided one or more criteria are met as will be described below.

The method in the UE served by the radio network node, where the UE is configured with at least one SCell and is configured to send one or more feedback information to the radio network node with the second reporting rate, wherein the UE feedback information is associated with the reception of signals on the configured and deactivated SCell, may comprise the steps of:

Receiving an SCell activation command for activating the deactivated SCell.

Reconfiguring for sending the one or more types of feedback information with the first reporting rate. The UE feedback information is also associated with the reception of signals on the activated SCell. The first reporting rate is higher than the second reporting rate.

The first reporting rate may be determined autonomously by the UE, may be pre-configured by the radio network node, or may be pre-determined.

Activating the SCell.

Sending feedback information associated with the activated SCell with the first reporting rate.

Reverting the reporting rate of the feedback information to the second reporting rate within a certain time period after the activation of the said SCell.

Figure 3A:
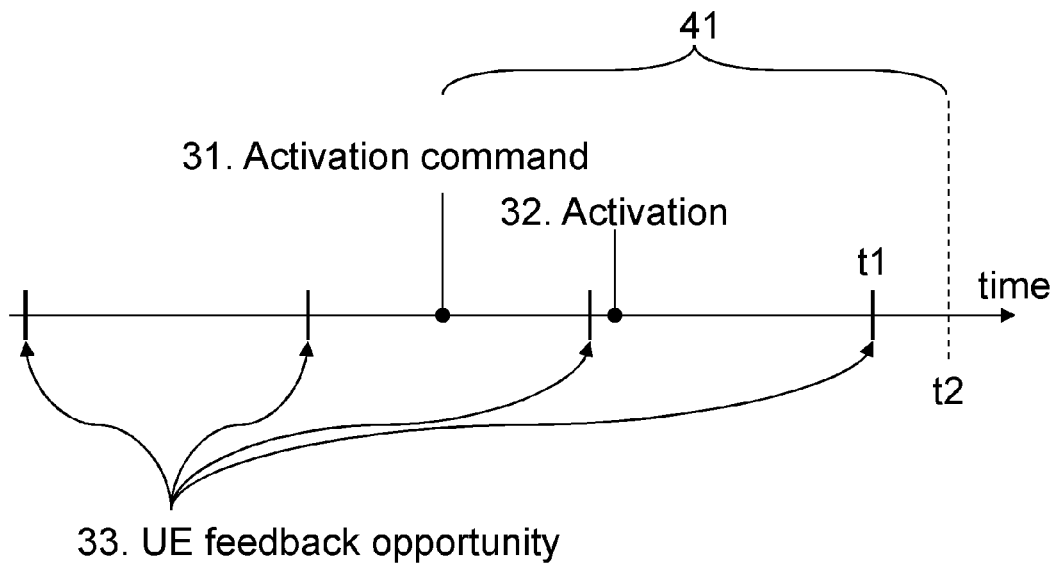
FIG. 3a illustrates schematically SCell activation according to prior art.
Figure 4A:
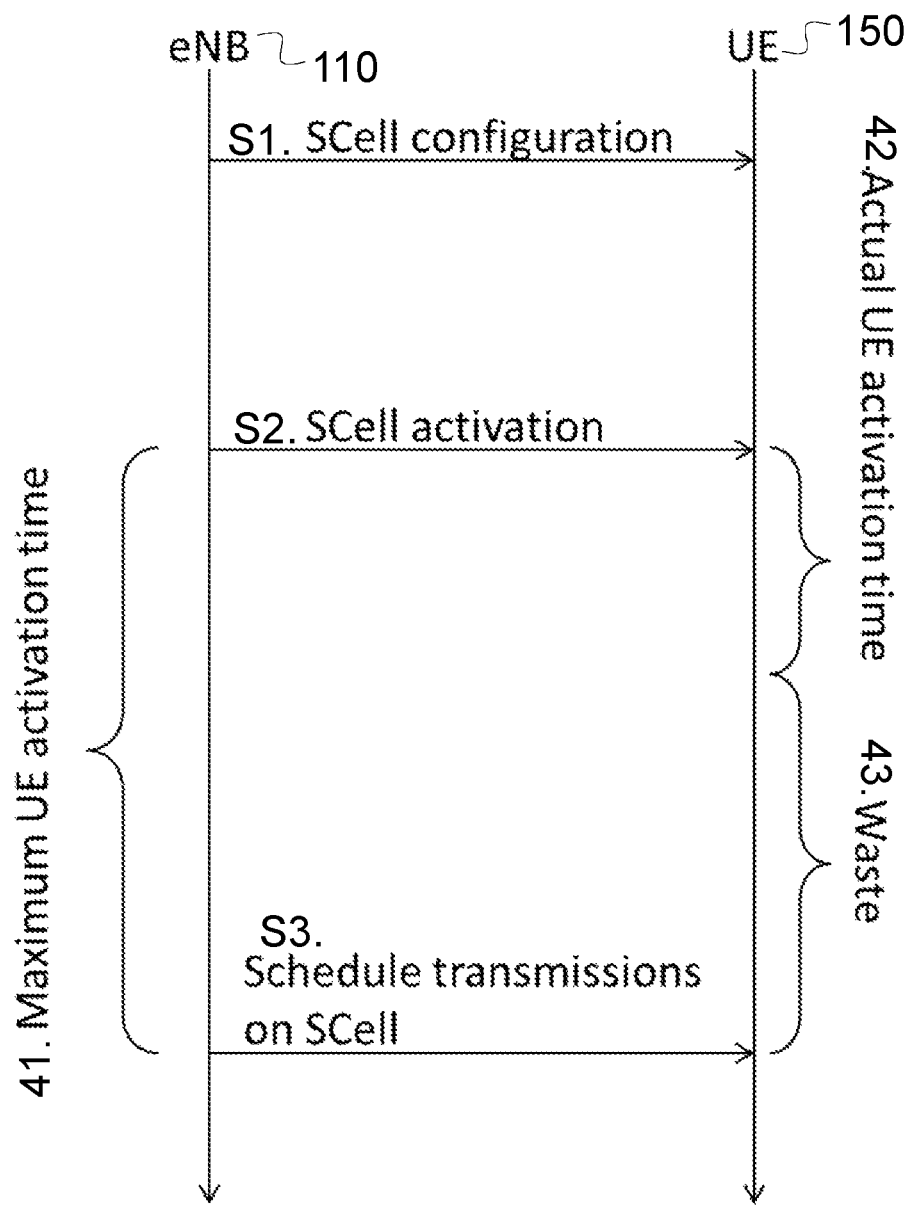
FIG. 4a is a signaling diagram schematically illustrating the signaling involved in the activation of the SCell according to prior art.

FIG. 3a shows the procedure of SCell activation according to prior art from the UE point of view. The UE will receive an activation command at 31 after which it needs some time to execute the SCell activation which is completed at 32. This exact execution time is not known to the eNodeB. However, a maximum allowed UE activation time 41 has been specified which can be used by the eNodeB to know when the SCell is activated. To say that the SCell is activated at time t2 is a pessimistic way of detecting SCell activation. A better alternative for the eNodeB to know when a UE has activated an SCell is for the eNodeB to detect UE feedback signaling, e.g. CSI for this SCell. The terminal only performs feedback signaling when the cell is activated which means that in the illustrated example in FIG. 3a the first feedback signaling opportunity 33 for the activated SCell will happen at time t1. Both the above alternatives for the eNodeB to detect SCell activation are pessimistic and the period of time from SCell activation at 32 until time t1, or t2, is wasted as the network will not schedule the UE for this period of time. User and network performance will thereby suffer. Furthermore, FIG. 4a is a signaling diagram schematically illustrating the signaling involved in the activation of the SCell according to prior art. In S1, the eNodeB 110 configures the UE 150 with an SCell. In S2 the eNodeB 110 sends a command for activating the SCell. After the maximum allowed UE activation time 41, the eNodeB 110 may schedule transmissions on the SCell in S3. However, the actual UE activation time of the SCell is given by the time period 42 indicated in the signaling diagram, which means that the time period 43 is wasted, as the eNodeB 110 could have scheduled the UE 150 during this time period if the eNodeB would have been able to detect the actual activation of the SCell already after time period 42.

Figure 3B:
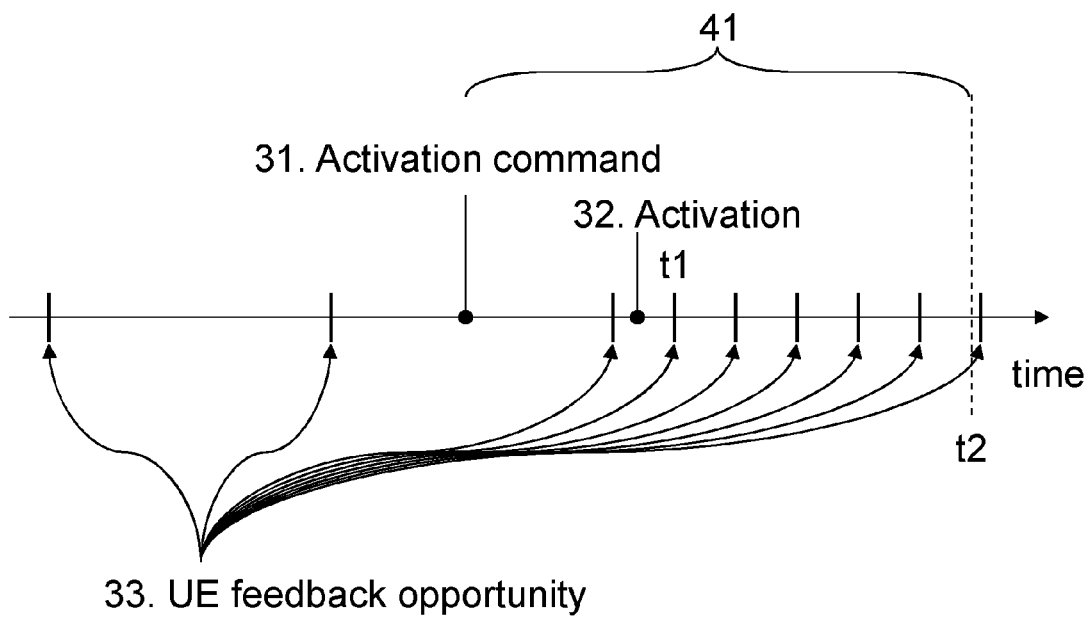
FIG. 3b illustrates schematically SCell activation according to embodiments.
Figure 4B:
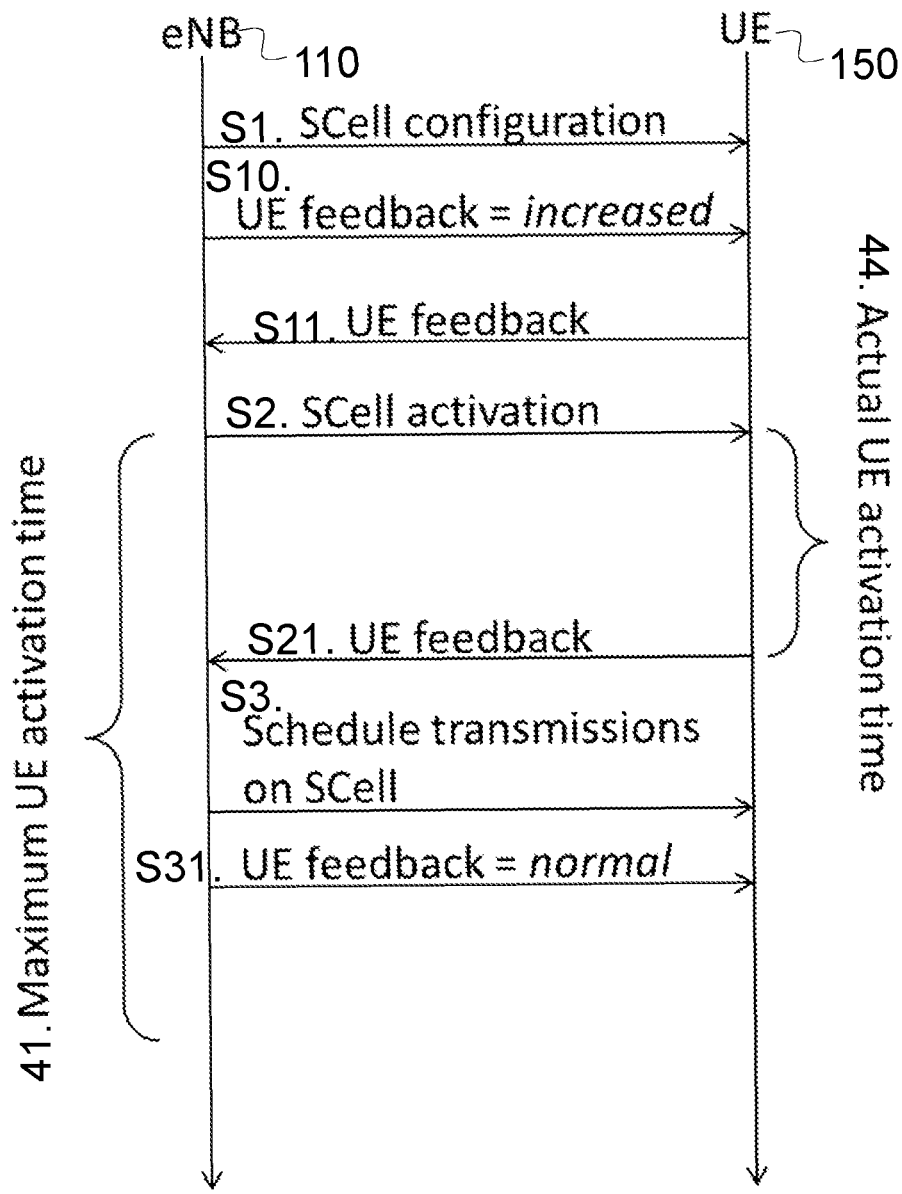
FIG. 4b is a signaling diagram schematically illustrating the signaling involved in the activation of the SCell according to embodiments.

FIG. 3b is a schematic illustration of the solution according to embodiments of the invention. As in FIG. 3a, the UE will receive an activation command at 31 after which it needs some time to execute the SCell activation at 32. The UE feedback frequency is higher for a period of time at activation so as to allow a quicker SCell activation detection by eNodeB. It is seen in FIG. 3b that the time from SCell activation at 32 until time t1 is shorter than in FIG. 3a which reduces waste and allows for better user and network performance as the UE can be scheduled in the SCell earlier. FIG. 4b is a signaling diagram schematically illustrating the signaling involved in the activation of the SCell according to embodiments, which also clarifies the advantages of embodiments of the invention. As in FIG. 4a, the eNodeB 110 configures the UE 150 with an SCell in S1, and sends a command for activating the SCell in S2. However, in between the eNodeB 110 configures the UE to transmit feedback information associated with the SCell at an increased rate in S10 and starts receiving the UE feedback at increased rate in S11. The next UE feedback is received in S21 after time period 44, and the UE feedback in S21 thus enables the eNodeB 110 to detect the activation of the SCell. The eNodeB 110 may thus schedule transmissions on the SCell in S3 which is well before the expiry of the maximum allowed UE activation time 41. In S31, the eNodeB 110 configures the UE 150 to transmit feedback information associated with the SCell at normal rate again. The feedback reporting rate of the UE is thus not high all the time. This reduces signaling overhead in UL, lowers overall UL interference, and improves overall performance.

Embodiments of the invention may use two states of UE feedback, normal and increased. In the normal state, the UE feedback is configured to meet requirements on efficiency and performance. Typically, in the increased state, the UE feedback is configured to be transmitted more often than in the normal state. UE feedback may for example be SRS transmissions and/or CSI reporting. There are two mechanisms of adapting the UE feedback information reporting rate:

1. Method in network node for adapting UE feedback information reporting rate.
2. Method in UE of autonomously adapting UE feedback information reporting rate Furthermore, the following embodiment adds value:

3. Method where the UE signals its capability of autonomously adapting feedback information reporting rate.

The above embodiments are elaborated in detail in the subsequent sections 1-3.

1. Method in Network Node for Adapting UE Feedback Information Reporting Rate

In this embodiment the reporting rate of the UE feedback information is adapted when the SCell is activated by the serving radio network node e.g. by the eNodeB. The procedure is transparent to the UE. The actions carried out by the eNodeB before and after the SCell activation and various steps involved are elaborated below.

In some embodiments the network may always adapt the UE feedback information reporting rate whenever the SCell is activated. In some embodiments the network based on one or more criteria may selectively adapt the UE feedback information reporting rate whenever the SCell is activated.

eNodeB Actions Before SCell Activation

The eNodeB configures the UE with at least one SCell. The configured SCell is assumed to be deactivated. Therefore the UE cannot receive data on this SCell. Before SCell activation the eNodeB configures UE feedback to increased state. Herein the UE feedback information is associated with the reception of the signals received from SCell. The UE may be configured to send the feedback information on a suitable physical channel, such as PUCCH or PUSCH. An example of UE feedback information is the CSI report, which in turn may comprise CQI, RI, and PMI. The UE may be configured with one or more types of feedback information such as CQI and PMI, which should be sent to the network.

In the increased state the UE is configured to send the feedback information with the first reporting rate. After configuring the UE feedback information with the first reporting rate the network activates the SCell by sending an SCell activation command to the UE. The eNodeB may also configure the UE with the first reporting rate just after sending an SCell activation command to the UE, but waiting longer after sending the activation command may reduce the gains. As one possible example, the activation command may be sent in TTI N and the configuration is done in TTI N+1.

eNodeB Actions after SCell Activation

When the SCell is activated the UE sends the feedback information to the serving eNodeB, where the feedback information contains a valid signal or measurement, e.g. a valid CQI measured on SCell such as CQI index=10. When the SCell is not activated, the UE may send an invalid measurement, e.g. out of range CQI such as CQI index=0. The reception of valid UE feedback information enables the eNodeB to detect that the SCell has been successfully activated. After the SCell activation has been detected by the eNodeB, the eNodeB configures the UE feedback to normal state. In the normal state the UE is configured to send the feedback information with the second reporting rate. The first reporting rate is higher than the second reporting rate. The first reporting rate therefore leads to shorter or more frequent periodic feedback reports compared to the feedback reporting associated with the second reporting rate. Examples of first reporting rate and second reporting rate of periodic CSI reporting are once every 2 ms and once every 20 ms respectively. The UE may be configured to report the same type of feedback information (e.g. CQI) or different types of feedback information in normal state and increased state.

Network Node Controlled Embodiments

The embodiments may be described using a series of method steps in the eNodeB and in the UE. The UE is configured to send UE feedback more often before SCell activation in order for the eNodeB to faster detect that the UE has activated the SCell.

Embodiment A

Step 1—The eNodeB configures the UE with SCell1.
Step 2—The eNodeB configures the UE to send UE feedback more often.
Step 3—The UE transmits UE feedback according to the configuration in Step 2.
Step 4—The eNodeB configures the UE to activate SCell1.
Step 5—The UE activates SCell1.
Step 6—The UE transmits UE feedback according to the configuration in Step 2.
Step 7—The eNodeB detects this feedback as indication that SCell1 has been activated.
Step 8—The eNodeB configures the UE to send UE feedback less often.
Step 9—The UE transmits UE feedback according to the configuration in Step 8.

In the above described embodiment A, the UE feedback may comprise SRS transmissions and/or CSI reports. In one embodiment, Step 1 and Step 2 are performed at the same time, i.e. the eNodeB configures the UE with SCell1 and to send UE feedback more often.

In the above described embodiment A the eNodeB sends a configuration with frequent UE feedback to the UE which should be used before the SCell activation has been detected by the eNodeB. The eNodeB then sends a configuration with not so frequent UE feedback to the UE to be used after detection of the SCell activation.

Embodiment B

In another embodiment, the eNodeB sends a type of configuration to the UE which tells the UE to send UE feedback with one frequency for a limited period of time T. After the period of time T the UE should apply another frequency. This type of configuration can be designed so that the UE will use frequent UE feedback during the period of time T after SCell activation which allows the network to easier detect that the additional serving cell has been configured. After the period of time T the frequency of the UE feedback is reduced. The benefit of this alternative is that only one UE feedback signaling configuration needs to be sent. Different alternatives for defining the time T are foreseen:

The period of time T may start at a given time and have a fixed length. For example T may start at reception of the SCell activation command 31 or it may start at the actual SCell activation time 32 and run for a fixed time. This fixed time could for example be the maximum allowed UE activation time 41.

The period of time T may alternatively be defined as the time between two events. For example it may be the time from the reception of the SCell activation command 31 or from the time of SCell activation 32 until the time of expiry of the maximum allowed UE activation time, or until the time of a first UL transmission grant or DL assignment.

Step 1—The eNodeB configures the UE with SCell1 and configures the UE to send frequent UE feedback between the time of activation of the SCell1 and the time when the maximum allowed UE activation time has passed. When the maximum allowed UE activation time has passed the UE shall send UE feedback with a normal frequency.

Step 2—The eNodeB configures the UE to activate SCell1.

Step 3—The UE activates SCell1.

Step 4—The UE transmits UE feedback according to the configuration in Step 1. This means that from the time of activation of SCell1, the UE sends feedback signaling with a high frequency, and after the expiry of the maximum allowed UE activation time the UE sends feedback signaling with a normal frequency.

Step 5—The eNodeB detects the UE feedback as indication that SCell1 has been activated.

Criteria for Adapting the UE Feedback Information Reporting Rate

According to this aspect the network node (e.g. the eNodeB) may also decide whether to configure or reconfigure the reporting rate of the UE feedback information to 'increased state' when the SCell is activated based on one or more criteria. For example the network will execute the procedure disclosed in the above sections provided one or more criteria are met. Otherwise the network does not change the reporting rate of the UE feedback information when the SCell is activated.

Examples of criteria which can be used to trigger the adaptation of the UE feedback information reporting rate are the following:

Type of carrier aggregation: The network always applies adaptation of the reporting rate when certain type of CA is configured for the UE. For example it always uses adaptation of the reporting rate for intra-band contiguous CA, and for any CA which requires the UE to use single radio receiver. The network is aware of the type of CA being used for the UE as the UE reports its CA capability. In case of intra-band contiguous CA the PCell and SCell timings are typically very similar. Therefore, in this case the UE can more quickly activate the SCell by reusing the PCell timing for synchronizing to the SCell. It is therefore more likely that the UE will require a shorter time to activate the SCell.

Radio deployment characteristics: The network always applies adaptation of the reporting rate when PCell and SCell are co-located in the same radio network node. In case of co-location, the received time difference between PCell and SCell at the UE is negligibly small. As a consequence the UE can more quickly activate the SCell by reusing the PCell timing for synchronizing to the SCell. Even for intra-band CA with non-located PCell and SCell, the UE may require much longer time to activate SCell unless it already knows the SCell timing to some extent prior to receiving SCell activation command.

Radio measurements: The UE can perform signal measurements such as RSRP and RSRQ on a non-configured cell and also on a deactivated SCell. In the latter case the UE measures sparsely typically once every network configured SCell measurement cycle. In case the network receives measurement results of the measurement, e.g. RSRP, performed by the UE on the SCell to be activated then the network may decide to adapt the UE feedback reporting rate after sending the SCell activation command to the UE. The network may also decide to adapt the UE feedback reporting rate provided the time between the received measurement and the moment network sends the SCell activation command is shorter than certain threshold, e.g. 1 second, or one SCell measurement cycle. This is because until certain time, e.g. corresponding to one SCell measurement cycle, after performing radio measurement on the SCell, the UE can maintain synchronization with that SCell. Therefore in this case it can more quickly activate the SCell and send valid feedback information, such as CQI, to the network.

Change in radio characteristics: In case the radio characteristics of the radio environment in which the UE is operating does not change significantly since the last measurement performed by the UE on the SCell, the network may also decide to adapt the UE feedback reporting rate after sending the SCell activation command to the UE. This is because in this case the UE is expected to more quickly synchronize with the SCell based on the latest measurement performed on the SCell. For example the radio characteristics are considered unchanged provided the following don't change substantially: UE speed, and multi-path delay spread. The network can determine radio characteristics based on radio measurements performed by the UE on PCell and/or on SCell.

2. Method in a UE of Autonomously Adapting Feedback Information Reporting Rate

According to this aspect, the UE autonomously adjusts the feedback information reporting rate from normal state to increase state when the SCell is being activated and revert it back to the normal state after the SCell has been activated. The advantage is that the autonomous mechanism in the wireless device of changing the feedback reporting rate during the SCell activation does not involve any configuration or reconfiguration from the network. This also reduces signaling overhead and avoids delays related to the change of feedback reporting rate.

Examples of Pre-Defined Rules to Govern UE Autonomous Behavior

The autonomous adjustment of the UE feedback information reporting rate may be governed by one or more pre-defined rules. Examples of some pre-defined rules are:

1. Upon receiving the SCell activation command the UE shall increase the reporting rate with which to send the feedback for the SCell and after the SCell has been activated the UE shall revert to the old reporting rate i.e. prior to receiving the SCell activation command.
2. Upon receiving the SCell activation command and until certain reference time (T0) after the SCell has been activated, the UE shall send the feedback for the SCell to the eNodeB with an increased reporting rate, e.g. first reporting rate or first reporting periodicity. The increased feedback reporting rate is higher than that configured by the eNodeB for sending the feedback associated with the SCell.

3. Upon receiving the SCell activation command and until certain reference time (T0) after the SCell has been activated, the UE shall send the feedback for the SCell to the eNodeB with the highest possible feedback rate, or with the shortest feedback reporting periodicity, or with a reference feedback rate or periodicity (R0).

4. In addition to any of the pre-defined rules 2 or 3 above, it may also be explicitly pre-defined that the UE shall also change the feedback reporting rate from increased state to normal state within T0 after the SCell is activated.

5. In yet another example of the pre-defined rules, it may be pre-defined that upon receiving the SCell activation command the UE shall send the feedback for the SCell to the eNodeB with the increased rate (e.g. first reporting rate) or with the highest possible feedback rate or with the shortest feedback reporting periodicity or with a reference feedback rate or periodicity (R0). The UE shall not revert to the normal feedback reporting rate after the SCell activation. It is up to the network to reconfigure the UE back to normal, to any longer feedback rate, or to continue with the increased feedback reporting rate.

6. It may also be pre-defined that the UE shall adapt the feedback reporting periodicity or rate upon receiving the SCell activation command according to any of the above pre-defined rules (i.e. rules 1-5) provided certain condition or criteria are met. Examples of criteria are those listed above in section 1 under sub paragraph Criteria for adapting the UE feedback information reporting rate. The UE may e.g. be required to adapt the feedback reporting periodicity or rate provided the UE is configured with intra-band contiguous CA.

7. The UE may also be pre-configured or receive an explicit indication or a message from the network, which message informs the UE whether the UE is allowed to autonomously adapt feedback information reporting rate or not due to SCell activation by following one or more of the above mentioned pre-defined rules 1-6. In this way one or more pre-defined rules can be enabled or disabled by this network control mechanism. The UE can be pre-configured with the message using RRC signaling or by lower layer signaling e.g. using a MAC command. The pre-configuration can be done at different instances or occasions e.g. when SCell is configured, or prior to deactivation.

The reference time period (T0) in the above pre-defined rules may either be pre-defined in the standard or it may be configured by the network. It may even be chosen by the UE. One example of a value of a pre-defined reference time period is 4 ms. In another example T0 can be expressed as K*shortest feedback reporting rate where K is an integer. T0 may in one exemplary embodiment be 8 ms with K=4 and the shortest feedback rate=2 ms. In another example T0 can be the time period up to the instant the UE sends the first feedback information immediately after the SCell activation. In yet another example it may be pre-defined that T0 is a function of the reference feedback rate R0, i.e. T0=f(R0). In embodiments, T0=1/R0 or T0=L*1/R0.

The reference feedback rate or periodicity (R0) in the above pre-defined rules may either be pre-defined in the standard, it may be configured by the network, or it may even be chosen by the UE. One example of a pre-defined reference feedback rate or periodicity is 4 ms. Yet another example is the highest reporting rate supported by the standard, such as once every 2 ms for LTE FDD and once every 10 ms for LTE TDD.

UE Controlled Embodiments

Embodiments may be described using a series of method steps in the eNodeB and in the UE. Some of the above pre-defined rules are elaborated below by describing various steps performed in the eNodeB and in the UE for different exemplary embodiments.

Embodiment C

Increased State Only During SCell Activation

Upon receiving the SCell activation command, the UE changes its feedback reporting rate from normal state to increased state, i.e. from the second to the first reporting rate. Furthermore, after the SCell activation the UE reverts to the normal state of the feedback reporting rate, i.e. to the second reporting rate used before the reception of the SCell activation command. The network also configures one or more parameters associated with the pre-defined rule. This alternative therefore elaborates pre-defined rules #1-4 described above.

Steps in eNodeB:
  The serving eNodeB configures the UE with at least one SCell, which is assumed to be deactivated.
  The serving eNodeB also configures the UE to send one or more feedback information to the radio network node with the second reporting rate, wherein the UE feedback information is associated with the reception of signals on the configured and deactivated SCell. The UE is required to send feedback information whenever the SCell becomes activated. The UE may also be configured with certain type of feedback e.g. SRS, CQI for the SCell.

Steps in UE:
  The UE receives an SCell activation command for activating the said deactivated SCell, The command is sent via a MAC-CE.
  The UE reconfigures the rate of sending the feedback information with the first reporting rate, wherein the UE feedback information is also associated with the reception of signals on the activated SCell. The first reporting rate is higher than the second reporting rate. The first reporting rate may be determined autonomously by the UE, or may be pre-configured by the radio network node, or may be pre-determined to be e.g. every 2 ms.
  The UE activates the SCell.
  The UE sends the feedback information associated with the activated SCell with the first reporting rate.
  The UE reverts the rate of the feedback information to the second reporting rate within a certain time period, e.g. 8 ms, after the SCell has been activated.

Embodiment D

Increased State Upon SCell Activation Command

Upon receiving the SCell activation command, the UE changes its feedback reporting rate from normal state to increased state, i.e. from the second to the first reporting rate. However after the SCell activation the UE does not revert to the normal state of the feedback reporting rate. It is therefore up to the network to change the feedback rate. This alternative therefore elaborates pre-defined rule #5 described above.

Steps in eNodeB:
The serving eNodeB configures the UE with at least one SCell, which is assumed to be deactivated.
The serving eNodeB also configures the UE to send one or more feedback information to the radio network node with the second reporting rate, wherein the UE feedback information is associated with the reception of signals on the configured and deactivated SCell. The UE is required to send feedback information whenever the SCell becomes activated. The UE may also be configured with certain type of feedback e.g. SRS, and CQI for the SCell.

Steps in UE:
The UE receives an SCell activation command for activating the deactivated SCell. The command is sent via a MAC-CE.
The UE reconfigures the rate of sending the feedback information with the first reporting rate, wherein the UE feedback information is also associated with the reception of signals on the activated SCell. The first reporting rate is higher than the second reporting rate. The first reporting rate may be determined autonomously by the UE, or may be pre-configured by the radio network node, or may be pre-determined to be e.g. every 2 ms.
The UE activates the SCell,
The UE sends the feedback information associated with the activated SCell with the first reporting rate.
The UE does not change the rate of the said feedback information reporting rate even after the SCell is activated. The UE therefore continues sending the feedback information to the network with the first reporting rate. The network may though reconfigure the UE to send the feedback information with another reporting rate, which is slower than the first reporting rate.

3. Method in a UE of Signaling the UE Capability of Autonomously Adapting Feedback Information Reporting Rate All UEs may not be capable of autonomously changing the feedback information reporting rate. Therefore, according to this embodiment, the UE indicates or provides relevant capability information to the network node, e.g. the eNodeB, relay, or BS, the relevant capability information being associated with the autonomous changing of feedback information reporting rate due to SCell activation.

Contents of Capability Information
More specifically the UE capability information may inform the network that the UE is capable of autonomously adapting or changing the reporting rate with which to send the feedback information associated with the SCell while the configured SCell is being activated. The UE capability information sent to the network node may also contain additional or specific information, such as:
The UE is capable of autonomously increasing the reporting rate of a certain type of feedback information, e.g. CSI, for the SCell from the start of receiving SCell activation command until the SCell is activated.
The UE is capable of autonomously increasing the reporting rate of certain type of feedback information, e.g. CSI, for the SCell to the highest pre-defined rate or to a rate with the shortest periodicity. The increase is done during the activation time, i.e. from the start of receiving the SCell activation command until the SCell is activated.
The UE is capable of any of the pre-defined rules defined in the above section "Examples of pre-defined rules to govern UE autonomous behavior".

Reporting Mechanism
The UE may send the capability information to the network node in any of the following manner:
Proactive reporting without receiving any explicit request from the network node, e.g. from the serving network node or any target network node. In case of proactive reporting the UE may report its capability during one or more of the following occasions: During initial setup or call setup e.g. when establishing the RRC connection; or during cell change e.g. during handover, during primary carrier change in multi-carrier operation, during PCell change in multi-carrier operation, during RRC re-establishment, or during RRC connection release with redirection.
Reporting upon receiving an explicit request from the network node, e.g. from the serving network node or any target network node. The explicit request can be sent to the UE by the network anytime or at a specific occasion. For example the request for the capability reporting can be sent to the UE during initial setup or after a cell change, e.g. after handover, after RRC connection re-establishment, after RRC connection release with redirection, after PCell change in CA, or after Primary CC change.

Usage of Received Capability Information by Network
The acquired UE capability information may be used by the network node for performing one or more radio operation tasks or actions. The radio operation tasks comprise e.g. selection of a procedure, and adapting a parameter in a configuration message related to measurement reporting or scheduling. Examples of such radio operation tasks are:
The decision at the network node whether to use the network controlled mechanism or the UE autonomous mechanism for adjusting the feedback reporting rate while the SCell is being activated.
If the UE is capable of adjusting the feedback reporting rate then the network may not change the feedback report rate when it activates the SCell as the UE can perform the task autonomously based on pre-defined rules.
If the UE is capable of adjusting the feedback reporting rate, the network may configure one or more parameters associated with the pre-defined rules, e.g. the values of the time period T0, and the reference reporting rate R0.

Methods Described in FIGS. 5a to 6b
FIG. 5a is a flowchart illustrating an embodiment of a method for detecting that an additional serving cell is activated. The embodiment may e.g. be embodiment A described previously. The method is implemented by a network node, such as network node 710 depicted in FIG. 7a, of a wireless communication system supporting carrier aggregation. The network node 710 serves a wireless device 750 configured with a first serving cell and the additional serving cell. The wireless device may in embodiments be configured with more than one additional serving cell. As in the example embodiments described previously, the wireless terminal may be a UE, and the network node may be an eNodeB in LTE. Furthermore, the additional serving cell may be an SCell. The method comprises:
510: Configuring the wireless device 750 to transmit feedback information associated with the additional serving cell at a first rate. In embodiments, the wireless device 750 may be configured to transmit feedback information associated with the additional serving cell at the first rate at reception of the command to activate the additional serving cell, or at activation of the additional serving cell. The feedback information rate will thus either be increased when the wireless device 750 receives the command to activate the additional serving cell, or when the wireless device 750 actually activates the additional serving cell.

520: Transmitting a command to the wireless device 750 to activate the additional serving cell.

530: Detecting the activation of the additional serving cell based on reception of feedback information from the wireless device 750.

540: Configuring the wireless device 750 to transmit feedback information associated with the additional serving cell at a second rate after activation of the additional serving cell. The second rate is lower than the first rate. In embodiments, the configuring of the wireless device 750 to transmit feedback information associated with the additional serving cell at the second rate is performed at or after detecting 530 the activation of the additional serving cell.

Figure 5A:
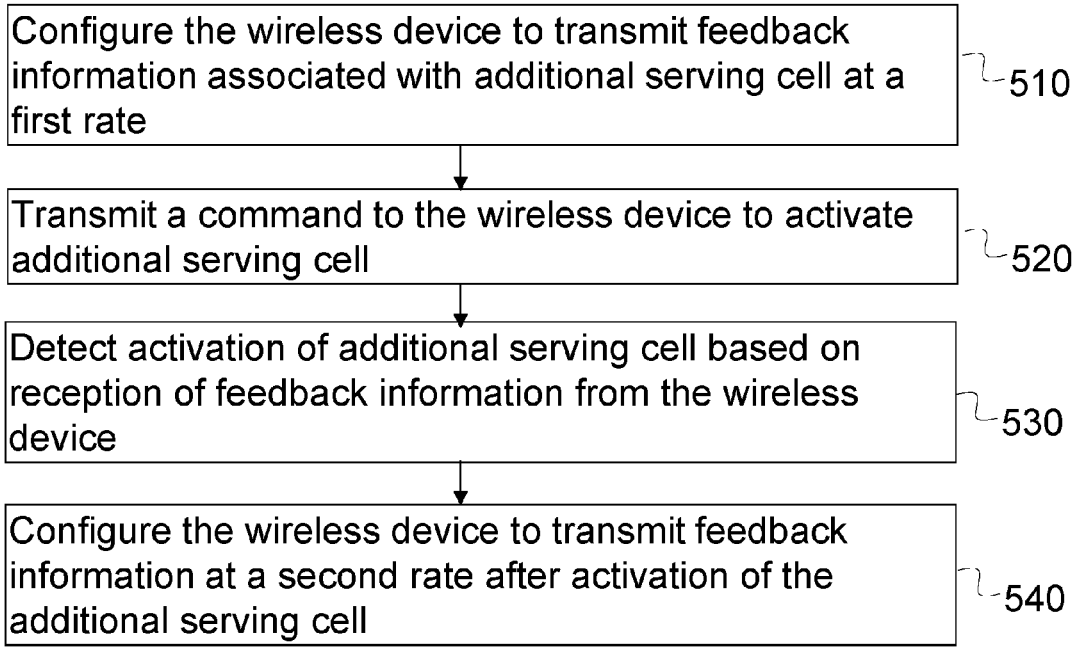
FIGS. 5a-c are flowcharts schematically illustrating the method implemented by a network node according to embodiments.
Figure 5B:
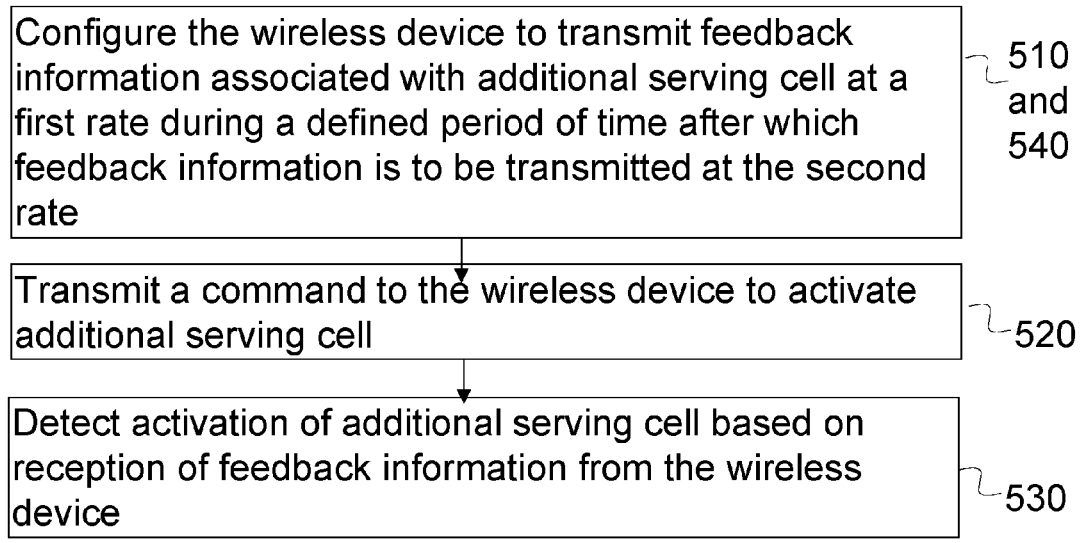
Figure 7A:
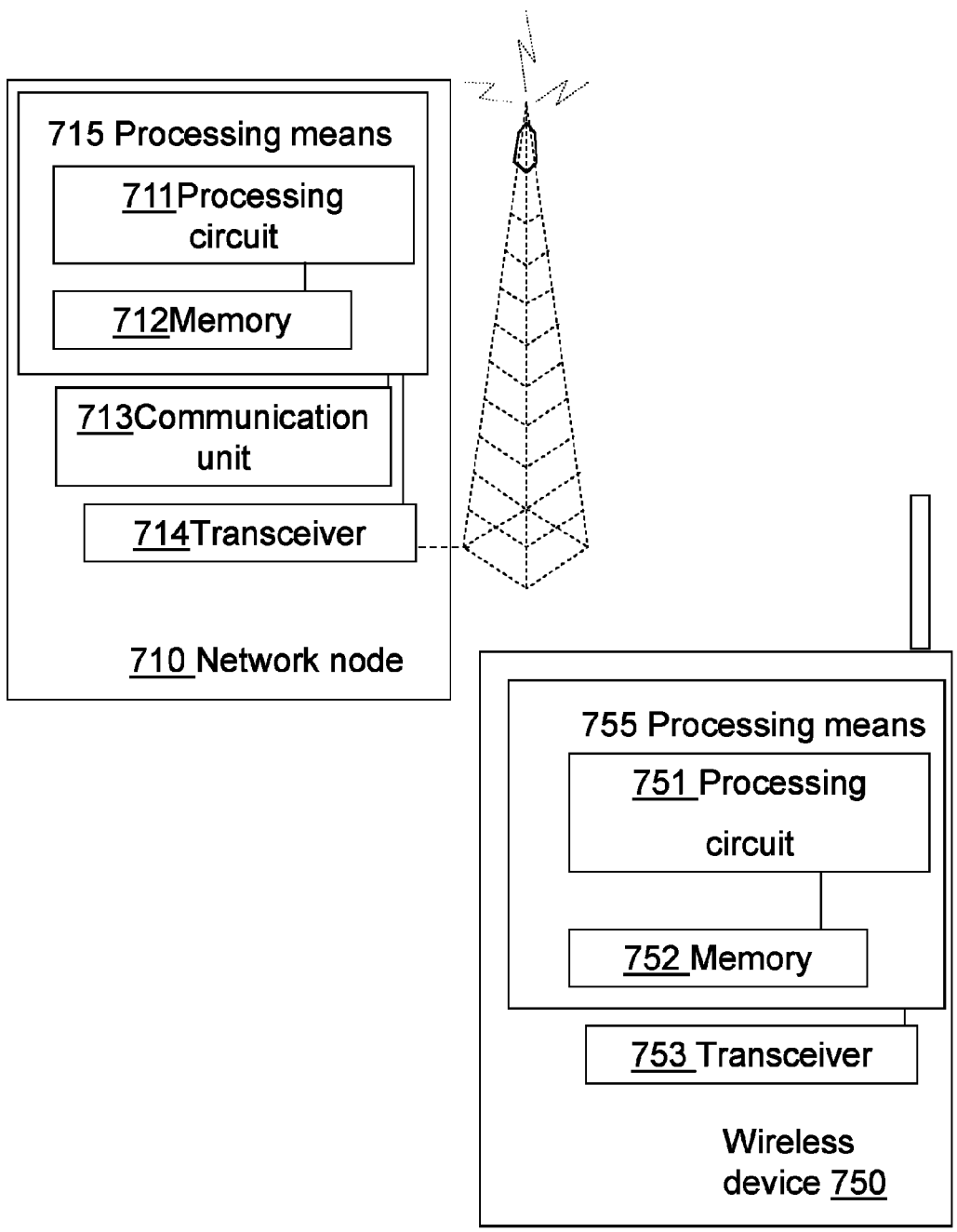
FIGS. 7a-b are block diagrams schematically illustrating a wireless device and a network node according to embodiments.

FIG. 5b is a flowchart illustrating another embodiment of the method in the network node, e.g. the network node 710 depicted in FIG. 7a. The embodiment corresponds to embodiment B described previously. The method comprises:

510 and 540: Configuring the wireless device 750 to transmit feedback information associated with the additional serving cell at a first rate at reception of the command to activate the additional serving cell, or at activation of the additional serving cell. Furthermore, the wireless device 750 is configured to transmit feedback information associated with the additional serving cell at the first rate during a defined period of time, after which feedback information is to be transmitted at the second rate. In this way, the wireless device 750 is configured to transmit feedback information associated with the additional serving cell at a second rate after activation of the additional serving cell as described in step 540 of FIG. 5a. The defined period of time T may be defined as described above in embodiment B.

520: Transmitting a command to the wireless device 750 to activate the additional serving cell.

530: Detecting the activation of the additional serving cell based on reception of feedback information from the wireless device 750.

Figure 5C:
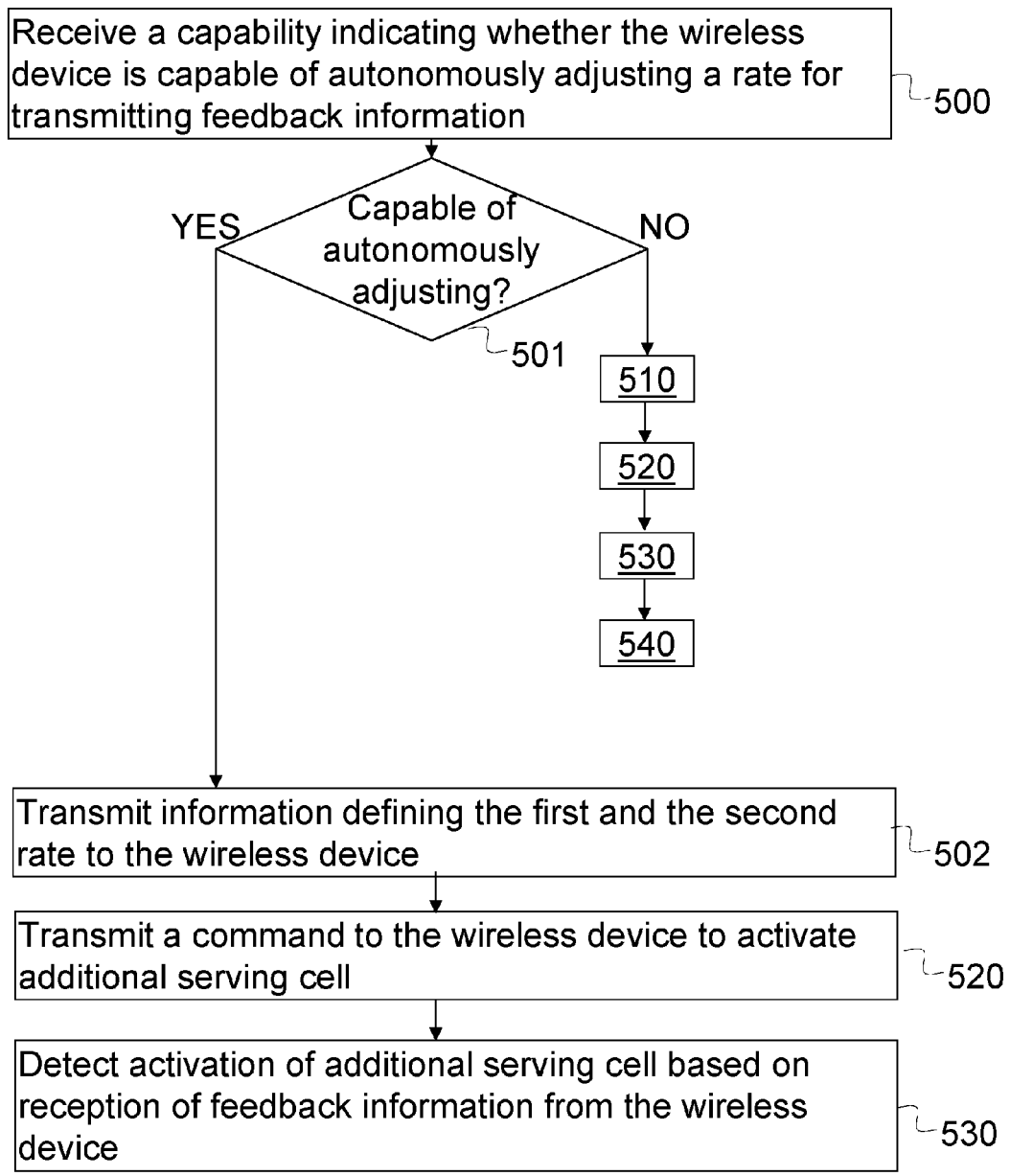

FIG. 5c is a flowchart illustrating another embodiment of the method in the network node such as the network node 710 depicted in FIG. 7a. The embodiment may correspond to embodiment C or D described previously, but also embodiment A is illustrated in the Figure. The method comprises:

500: Receiving a capability from the wireless device 750. The capability indicates whether the wireless device 750 is capable of autonomously adjusting a rate for transmitting feedback information associated with the additional serving cell at activation of the additional serving cell. The capability is either sent proactively by the wireless device, or received upon request from the network node as described above.

501: Determining whether to configure the wireless device 750 to transmit feedback information associated with the additional serving cell at the first rate and at the second rate before and after activation of the additional serving cell respectively as described in steps 510 and 540 of FIG. 5a. The determining is done based on the received capability. When the received capability indicates that the wireless device 750 is capable of autonomously adjusting the rate for transmitting feedback information, the method comprises determining not to configure the wireless device 750 to transmit feedback information associated with the additional serving cell at the first rate and at the second rate before and after activation of the additional serving cell respectively. Furthermore, the method comprises:

502: Transmitting information defining the first and the second rate to the wireless device 750, for enabling the wireless device 750 to autonomously adjust the rate for transmitting feedback information at activation of the additional serving cell.

520: Transmitting the command to the wireless device 750 to activate the additional serving cell.

530: Detecting the activation of the additional serving cell based on reception of feedback information from the wireless device 750.

When the received capability indicates that the wireless device 750 is not capable of autonomously adjusting the rate for transmitting feedback information, it is determined to configure the wireless device 750 to transmit feedback information associated with the additional serving cell at the first rate and at the second rate before and after activation of the additional serving cell respectively. The method illustrated e.g. in FIG. 5a comprising the steps 510-540 is thus performed as described above.

In embodiments, the method may further comprise determining whether following criteria is met: that intra-band contiguous CA or any CA requiring the UE to use a single radio receiver is configured; that the additional serving cell is collocated with the first serving cell of the network node 710; that a measurement report for the additional serving cell before activation is available; and/or that radio characteristics of the radio environment for the wireless device 750 are stable since reception of the wireless device 750 measurement report for the additional serving cell. The wireless device 750 may be configured 510, 540 to transmit feedback information associated with the additional serving cell at the first rate and at the second rate before and after activation of the additional serving cell respectively, only if at least one of the criteria is met.

Figure 6A:
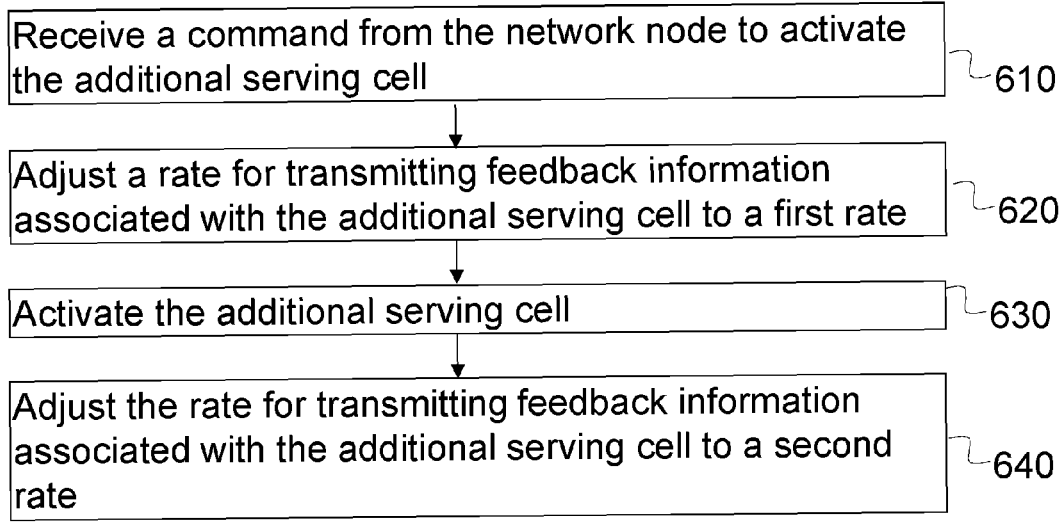
FIGS. 6a-b are flowcharts schematically illustrating the method implemented by a wireless device according to embodiments.
Figure 6B:
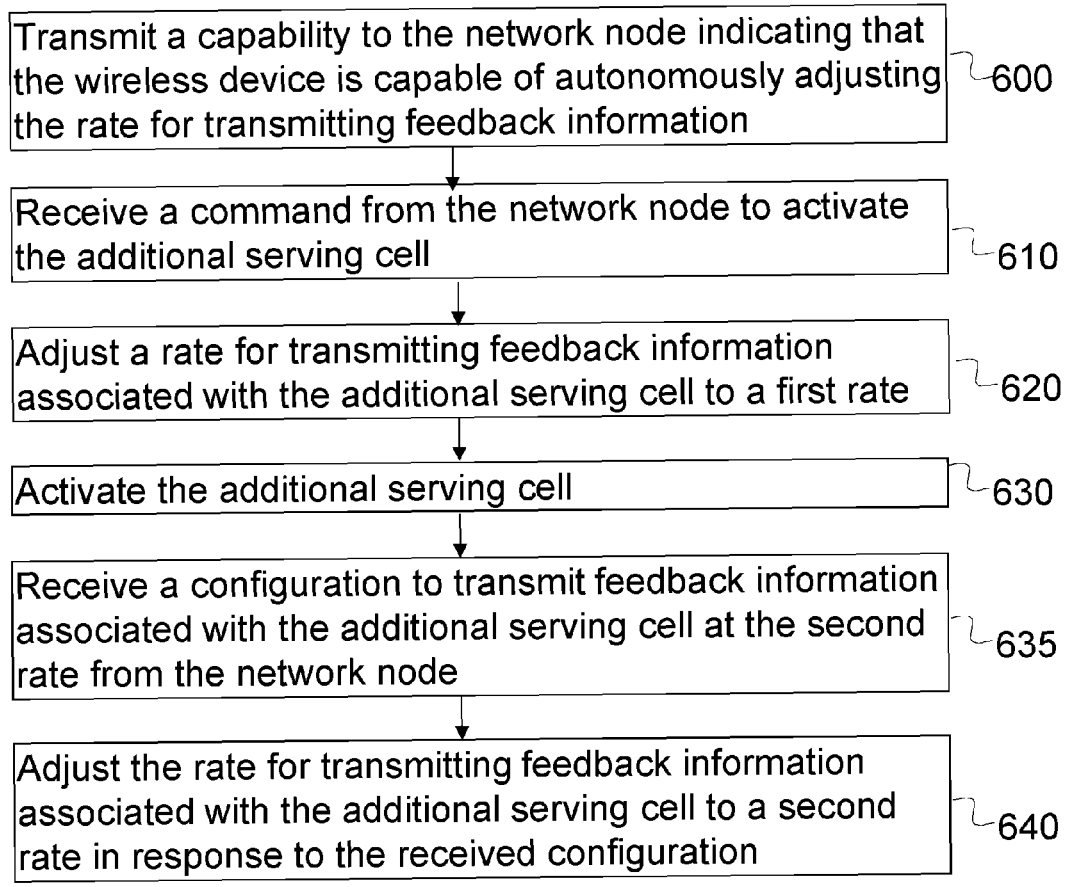

FIG. 6a is a flowchart illustrating an embodiment of a method implemented by a wireless device, e.g. the wireless device 750 depicted in FIG. 7a, supporting CA and configured with a first serving cell and an additional serving cell. The embodiment corresponds to the autonomous adjustment of the feedback reporting rate by the UE. The method is suitable for enabling detection of activation of the additional serving cell by a network node, such as the network node 710 depicted in FIG. 7a, serving the wireless device 750. The method comprises:

610: Receiving a command from the network node 710 to activate the additional serving cell. In response to the received command, the method comprises:

620: Adjusting a rate for transmitting feedback information associated with the additional serving cell to a first rate.

630: Activating the additional serving cell.

The method also comprises:

640: Adjusting the rate for transmitting feedback information associated with the additional serving cell to a second rate, after activating 630 the additional serving cell. As before, the second rate is lower than the first rate. The information defining the first rate and the second rate may be received from the network node 710.

In one embodiment, e.g. as in embodiment C described previously, the rate may be adjusted 640 to the second rate when a period of time has lapsed from activating 630 the additional serving cell. Information defining the period of time may be received from the network node 710. In an alternative embodiment illustrated in FIG. 6b, the method may further comprise—as in embodiment D described above:

635: Receiving a configuration to transmit feedback information associated with the additional serving cell at the second rate from the network node 710.

640: The rate is adjusted to the second rate in response to the received configuration from the network node 710.

The method may further comprise:

600: Transmitting a capability to the network node 710 indicating that the wireless device 750 is capable of autonomously adjusting the rate for transmitting feedback information associated with the additional serving cell at activation of the additional serving cell. This step corresponds to step 500 performed by the wireless device described above.

In embodiments, the method may further comprise determining whether following criteria are met: that intra-band contiguous carrier aggregation is configured; that the additional serving cell is collocated with the first serving cell of the network node 710; that a time period between performing a measurement for the additional serving cell and reception of the command from the network node 710 to activate the additional serving cell is shorter than a threshold; and/or that radio characteristics of the radio environment for the wireless device 750 are stable since performing the measurement for the additional serving cell. Adjusting, in 620 and 640, the rate for transmitting feedback information associated with the additional serving cell to the first rate and to the second rate before and after activating the additional serving cell respectively, is only performed if at least one of the criteria is met.

In any of the above embodiments, the feedback information may comprise SRS transmissions, and/or CSI reports. Furthermore, the first serving cell may be a PCell and the additional serving cell may be an SCell.

In accordance with other aspects of embodiments, a method implemented by a radio network node of a wireless communication system supporting carrier aggregation, for improved detection of an activation of a secondary serving cell, is provided. The radio network node serves a wireless device configured with the secondary serving cell. The method comprises configuring the wireless device to transmit feedback information associated with the secondary serving cell at an increased rate, before transmitting a command to the wireless device to activate the secondary serving cell. The method also comprises detecting the activation of the secondary serving cell based on reception of the feedback information from the wireless device, and reconfiguring the wireless device to transmit feedback information associated with the secondary serving cell at a lowered rate after the detection of the activation.

In accordance with further aspects of embodiments, a method implemented by a wireless device supporting carrier aggregation and configured with a secondary serving cell, for enabling improved detection of an activation of the secondary serving cell by a radio network node serving the wireless device, is provided. The method comprises receiving a command from the radio network node to activate the secondary serving cell, and increasing the rate of feedback information associated with the secondary serving cell in response to the received command. The method also comprises activating the secondary serving cell, and lowering the rate of the feedback information associated with the secondary serving cell after having transmitted feedback information associated with the activated secondary serving cell. The method may optionally comprise signaling a capability of autonomously adjusting the rate of transmitting the feedback information at activation of the secondary serving cell, wherein the capability is signaled to the radio network node.

In accordance with still further aspects of embodiments, a method implemented by a radio network node of a wireless communication system supporting carrier aggregation, for improved detection of an activation of a secondary serving cell, is provided. The radio network node serves a wireless device configured with the secondary serving cell. The method comprises receiving a capability of autonomously adapting the rate of transmitting feedback information associated with the secondary serving cell. The capability is received from the wireless device. The method also comprises determining whether to configure the wireless device to transmit feedback information associated with the secondary serving cell at an increased rate before activating the secondary serving cell, based on the received capability.

Apparatus

In view of the above discussion, it will be appreciated that the above-described embodiments include methods performed at one or more radio network nodes in a network, such as at an LTE eNodeB, and at one or more wireless devices. It will also be appreciated that the several techniques described above, as well as their sub-processes, can be used in any combination unless it is obvious that that those techniques or sub-processes are inherently incompatible with one another. Other embodiments include radio network node apparatus, such as an eNodeB, and wireless device apparatus corresponding to the methods and techniques described above. They are further described below with reference to FIGS. 7a and 7b.

An embodiment of a network node 710 of a wireless communication system for detecting that an additional serving cell is activated is schematically illustrated in the block diagram in FIG. 7a. The network node 710 is configured to support CA and to serve a wireless device 750 configured with a first serving cell and the additional serving cell. The network node 710 comprises a transceiver 714 and processing means 715 adapted to configure the wireless device 750 to transmit feedback information associated with the additional serving cell at a first rate, and transmit via the transceiver 714 a command to the wireless device to activate the additional serving cell. The processing means 715 is further adapted to detect the activation of the additional serving cell based on reception of feedback information from the wireless device 750, and configure the wireless device 750 to transmit feedback information associated with the additional serving cell at a second rate after activation of the additional serving cell. The second rate is lower than the first rate.

The processing means 715 may be adapted to configure the wireless device 750 to transmit feedback information associated with the additional serving cell at the first rate at reception of the command to activate the additional serving cell, or at activation of the additional serving cell. Furthermore, the processing means 715 may be adapted to configure the wireless device 750 to transmit feedback information associated with the additional serving cell at the second rate after activation of the additional serving cell by configuring the wireless device 750 to transmit feedback information associated with the additional serving cell at the first rate during a defined period of time, after which feedback information is to be transmitted at the second rate.

In another embodiment, the processing means 715 may be adapted to configure the wireless device 750 to transmit feedback information associated with the additional serving cell at the second rate at or after detecting the activation of the additional serving cell.

The processing means 715 may also be adapted to receive a capability from the wireless device 750 via the transceiver 714. The capability indicates whether the wireless device 750 is capable of autonomously adjusting a rate for transmitting feedback information associated with the additional serving cell at activation of the additional serving cell. The processing means 715 may be further adapted to determine whether to configure the wireless device 750 to transmit feedback information associated with the additional serving cell at the first rate and at the second rate before and after activation of the additional serving cell respectively, based on the received capability. The processing means 715 may be adapted to, when the received capability indicates that the wireless device 750 is capable of autonomously adjusting the rate for transmitting feedback information, determine not to configure the wireless device 750 to transmit feedback information associated with the additional serving cell at the first rate and at the second rate before and after activation of the additional serving cell respectively. Furthermore, the processing means 715 may be adapted to transmit information defining the first and the second rate via the transceiver 714 to the wireless device 750, for enabling the wireless device 750 to autonomously adjust the rate for transmitting feedback information at activation of the additional serving cell.

The processing means 715 may be adapted to determine whether at least one of following criteria is met: that intra-band contiguous carrier aggregation is configured; that the additional serving cell is collocated with the first serving cell of the network node 710; that a measurement report for the additional serving cell before activation is available; and that radio characteristics of the radio environment for the wireless device 750 are stable since reception of the wireless device 750 measurement report for the additional serving cell. The processing means may be further adapted to configure the wireless device 750 to transmit feedback information associated with the additional serving cell at the first rate and at the second rate before and after activation of the additional serving cell respectively, only if at least one of the criteria is met.

An embodiment of a wireless device 750 suitable for enabling detection of activation of an additional serving cell by a network node 710 serving the wireless device 750, is also schematically illustrated in the block diagram in FIG. 7a. The wireless device 750 is configured to support CA, and is configured with a first serving cell and the additional serving cell. The wireless device 750 comprises a transceiver 753 and processing means 755 adapted to receive a command from the network node 710 via the transceiver 753 to activate the additional serving cell. The processing means 755 is also adapted to, in response to the received command, adjust a rate for transmitting feedback information associated with the additional serving cell to a first rate, and activate the additional serving cell. Furthermore, the processing means 755 is adapted to adjust the rate for transmitting feedback information associated with the additional serving cell to a second rate, after activating the additional serving cell. The second rate is lower than the first rate.

The processing means 755 may be adapted to receive information defining the first rate and the second rate from the network node 710 via the transceiver 753. Furthermore, the processing means 755 may be adapted to adjust the rate to the second rate when a period of time has lapsed from activation of the additional serving cell. The processing means 755 may be adapted to receive information defining the period of time from the network node 710 via the transceiver 753. Alternatively, the processing means 755 may be adapted to receive a configuration to transmit feedback information associated with the additional serving cell at the second rate from the network node 710 via the transceiver 753, and to adjust the rate for transmitting feedback information to the second rate in response to the received configuration.

In embodiments, the processing means 755 is adapted to transmit a capability via the transceiver 753 to the network node 710. The capability indicates that the wireless device 750 is capable of autonomously adjusting the rate for transmitting feedback information associated with the additional serving cell at activation of the additional serving cell. The processing means 755 may be further adapted to determine whether at least one of following criteria is met: that intra-band contiguous carrier aggregation is configured; that the additional serving cell is collocated with the first serving cell of the network node 710; that a time period between performing a measurement for the additional serving cell and reception of the command from the network node 710 to activate the additional serving cell is shorter than a threshold; and that radio characteristics of the radio environment for the wireless device 750 are stable since performing the measurement for the additional serving cell. The processing means 755 may also be adapted to adjust the rate for transmitting feedback information associated with the additional serving cell to the first rate and to the second rate before and after activating the additional serving cell respectively, only if at least one of the criteria is met.

The network node 710 illustrated in the block diagram in FIG. 7a, may be a radio network node such as an eNodeB in LTE. The processing means 715 of the network node 710 may in one embodiment comprise a memory 712 and one or more processing circuits 711, wherein the processing circuits 711 are configured to perform the methods of the network node described previously with reference to FIGS. 5a-c. The network node 710 may further comprise a communication unit 713 configured to communicate with other network nodes, and a transceiver 714 configured to receive and transmit signals from/to the wireless device 750.

The wireless device 750 may for example be a UE wirelessly connected to the network node 710. The processing means 755 of the wireless device 750 may comprise a memory 752 and one or more processing circuits 751, wherein the processing circuits 751 are configured to perform the methods of the wireless device described previously with reference to FIGS. 6a-b. The wireless device 750 may further comprise a transceiver 753 configured to receive and transmit signals from/to the radio network node 710.

Figure 7B:
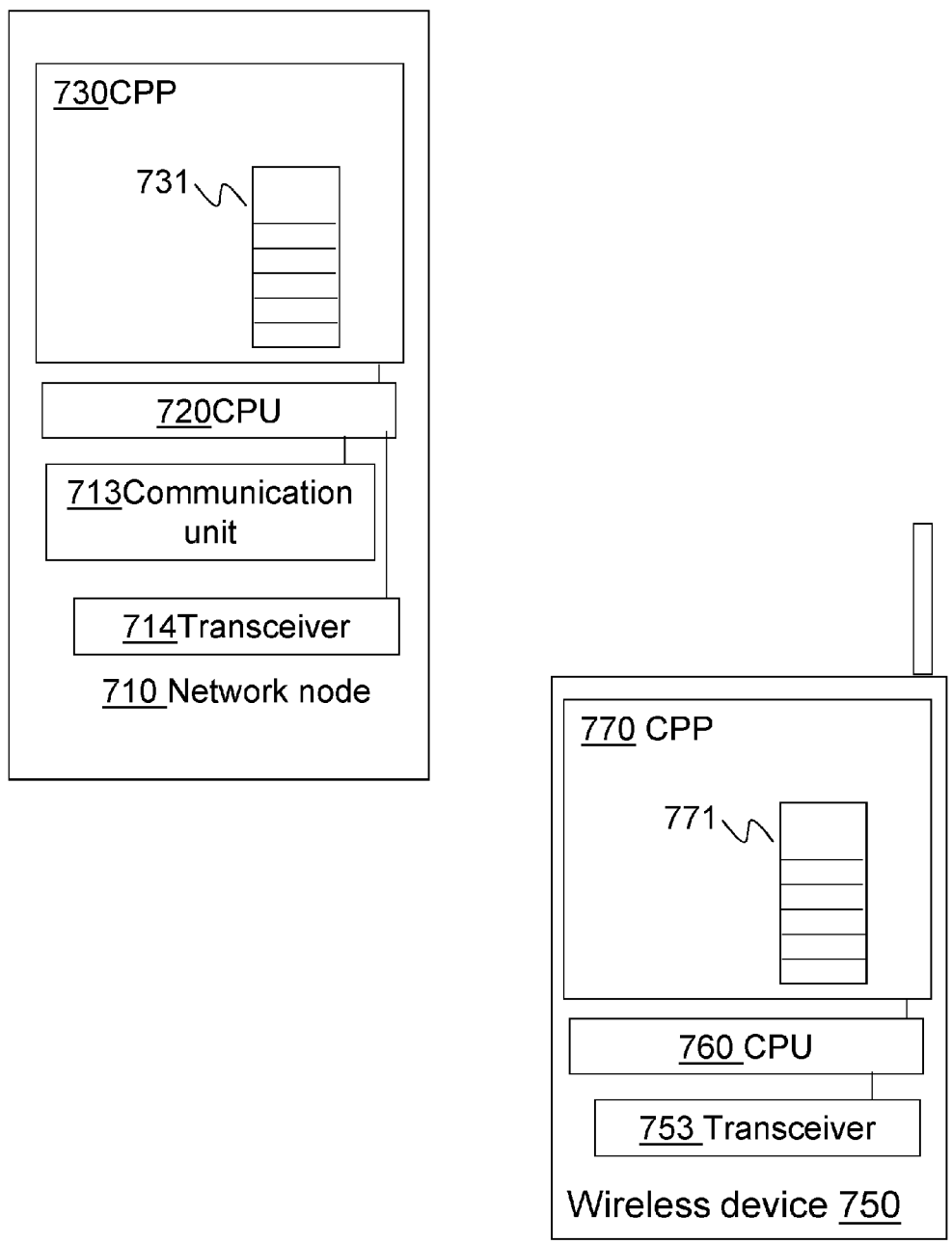

FIG. 7b illustrates an alternative way to describe the embodiments in FIG. 7a. The network node 710 may comprise, in addition to the communication unit 713 and the transceiver 714 described previously, a Central Processing Unit CPU 720 which may be a single unit or a plurality of units. Furthermore, the network node 710 may comprise at least one computer program product CPP 730 in form of a computer readable medium, e.g. a non-volatile memory such as an EEPROM Electrically Erasable Programmable Read-Only Memory, a flash memory or a disk drive. The CPP 730 also comprises a computer program 731 stored on the computer readable medium. The computer program 731 in turn comprises computer readable code means which when run on the CPU 720 causes the network node to perform the methods described above.

In the same way, the wireless device 750 comprises a CPU 760 which may be a single unit or a plurality of units, at least one CPP 770 in form of a computer readable medium, wherein the CPP 770 also comprises a computer program 771 stored on the computer readable medium. The computer program 771 in turn comprises computer readable code means which when run on the CPU 760 causes the wireless device to perform the methods of the wireless device described previously.

In still another alternative way to describe the embodiment in FIG. 7a, the network node 710 comprises a module adapted to configure the wireless device 750 to transmit feedback information associated with the additional serving cell at a first rate, and a module adapted to transmit a command to the wireless device 750 to activate the additional serving cell. The network node 710 also comprises a module adapted to detect the activation of the additional serving cell based on reception of feedback information from the wireless device 750, and a module adapted to configure the wireless device 750 to transmit feedback information associated with the additional serving cell at a second rate after activation of the additional serving cell, wherein the second rate is lower than the first rate. The wireless device 750 comprises a module adapted to receive a command to activate the additional serving cell from the network node 710, and a module adapted to adjust a rate for transmitting feedback information associated with the additional serving cell to a first rate in response to the received command. The wireless device 750 also comprises a module adapted to activate the additional serving cell in response to the received command, and a module adapted to adjust the rate for transmitting feedback information associated with the additional serving cell to a second rate, after activating the additional serving cell. The second rate is lower than the first rate. The modules described are functional units which may be implemented in hardware, software, firmware or any combination thereof. In one embodiment, the modules are implemented as a computer program running on a processor.

In accordance with other aspects of embodiments, a radio network node of a wireless communication system supporting carrier aggregation is provided. The radio network node is configured to improve detection of an activation of a secondary serving cell, and to serve a wireless device configured with the secondary serving cell. The radio network node comprises a processing circuit associated with a memory and adapted to configure the wireless device to transmit feedback information associated with the secondary serving cell at an increased rate, before transmitting a command to the wireless device to activate the secondary serving cell. The processing circuit is also configured to detect the activation of the secondary serving cell based on reception of the feedback information from the wireless device, via a transceiver. The processing circuit is also configured to reconfigure the wireless device to transmit feedback information associated with the secondary serving cell at a lowered rate after the detection of the activation.

In accordance with further aspect of embodiments, a wireless device supporting carrier aggregation and configured with a secondary serving cell is provided. The wireless device is configured to enable improved detection of an activation of the secondary serving cell by a radio network node serving the wireless device. The wireless device comprises a transceiver for receiving a command from the radio network node to activate the secondary serving cell, and a processing circuit associated to a memory and configured to increase the rate of feedback information associated with the secondary serving cell in response to the received command. The processing circuit is also configured to activate the secondary serving cell, and lower the rate of the feedback information associated with the secondary serving cell after having transmitted feedback information associated with the activated secondary serving cell. Optionally, the processing circuit and the transceiver may be configured to signal a capability of autonomously adjusting the rate of transmitting the feedback information at activation of the secondary serving cell, to the radio network node.

In accordance with still further aspects of embodiments, a radio network node of a wireless communication system supporting carrier aggregation is provided. The radio network node is configured to improve detection of an activation of a secondary serving cell, and to serve a wireless device configured with the secondary serving cell. The radio network node comprises a transceiver configured to receive a capability of autonomously adapting the rate of transmitting feedback information associated with the secondary serving cell, from the wireless device. The radio network node also comprises a processing circuit associated with a memory, configured to determine whether to configure the wireless device to transmit feedback information associated with the secondary serving cell at an increased rate before activating the secondary serving cell, based on the received capability.

Examples of several embodiments have been described in detail above, with reference to the attached illustrations of specific embodiments. Because it is not possible, of course, to describe every conceivable combination of components or techniques, those skilled in the art will appreciate that the present technology may be implemented in other ways than those specifically set forth herein, without departing from essential characteristics of the embodiments.

The invention claimed is:

1. A method, implemented by a network node of a wireless communication system supporting carrier aggregation, for detecting that an additional serving cell is activated, wherein the network node serves a wireless device configured with a first serving cell and the additional serving cell, the method comprising:
    configuring the wireless device to transmit feedback information associated with the additional serving cell at a first rate;
    transmitting a command to the wireless device to activate the additional serving cell;
    detecting the activation of the additional serving cell based on reception of feedback information from the wireless device;
    configuring the wireless device to transmit feedback information associated with the additional serving cell at a second rate after activation of the additional serving cell, wherein the second rate is lower than the first rate.

2. The method of claim 1, wherein the wireless device is configured to transmit feedback information associated with the additional serving cell at the first rate at reception of the command to activate the additional serving cell, or at activation of the additional serving cell.

3. The method of claim 2, wherein the configuring the wireless device to transmit feedback information associated with the additional serving cell at the second rate is performed by configuring the wireless device to transmit feedback information associated with the additional serving cell at the first rate during a defined period of time after which feedback information is to be transmitted at the second rate.

4. The method of claim 1, wherein the configuring the wireless device to transmit feedback information associated with the additional serving cell at the second rate is performed at or after detecting the activation of the additional serving cell.

5. The method according to claim 1, further comprising:
receiving a capability from the wireless device indicating whether the wireless device is capable of autonomously adjusting a rate for transmitting feedback information associated with the additional serving cell at activation of the additional serving cell; and
determining, based on the received capability, whether to configure the wireless device to transmit feedback information associated with the additional serving cell at the first rate and at the second rate before and after activation of the additional serving cell, respectively.

6. The method of claim 5, further comprising when the received capability indicates that the wireless device is capable of autonomously adjusting the rate for transmitting feedback information:
determining not to configure the wireless device to transmit feedback information associated with the additional serving cell at the first rate and at the second rate before and after activation of the additional serving cell respectively;
transmitting information defining the first and the second rate to the wireless device, for enabling the wireless device to autonomously adjust the rate for transmitting feedback information at activation of the additional serving cell.

7. The method of claim 1, further comprising:
determining whether at least one of following criteria is met:
that intra-band contiguous carrier aggregation is configured;
that the additional serving cell is collocated with the first serving cell of the network node;
that a measurement report for the additional serving cell before activation is available; and
that radio characteristics of the radio environment for the wireless device are stable since reception of the wireless device measurement report for the additional serving cell;
configuring the wireless device to transmit feedback information associated with the additional serving cell at the first rate and at the second rate before and after activation of the additional serving cell, respectively, only if at least one of the criteria is met.

8. A method, implemented by a wireless device supporting carrier aggregation and configured with a first serving cell and an additional serving cell, for enabling detection of activation of the additional serving cell by a network node serving the wireless device, the method comprising:
receiving a command from the network node to activate the additional serving cell;
in response to the received command:
adjusting a rate for transmitting feedback information associated with the additional serving cell to a first rate; and
activating the additional serving cell;
adjusting the rate for transmitting feedback information associated with the additional serving cell to a second rate, after activating the additional serving cell, wherein the second rate is lower than the first rate.

9. The method of claim 8, wherein information defining the first rate and the second rate is received from the network node.

10. The method of claim 8, wherein the rate is adjusted to the second rate when a period of time has lapsed from activating the additional serving cell.

11. The method of claim 10, wherein information defining the period of time is received from the network node.

12. The method of claim 8:
further comprising receiving a configuration to transmit feedback information associated with the additional serving cell at the second rate from the network node;
wherein the rate is adjusted to the second rate in response to the received configuration.

13. The method of claim 8, further comprising transmitting a capability to the network node indicating that the wireless device is capable of autonomously adjusting the rate for transmitting feedback information associated with the additional serving cell at activation of the additional serving cell.

14. The method of claim 8, further comprising:
determining whether at least one of following criteria is met:
that intra-band contiguous carrier aggregation is configured;
that the additional serving cell is collocated with the first serving cell of the network node;
that a time period between performing a measurement for the additional serving cell and reception of the command from the network node to activate the additional serving cell is shorter than a threshold; and
that radio characteristics of the radio environment for the wireless device are stable since performing the measurement for the additional serving cell;
adjusting the rate for transmitting feedback information associated with the additional serving cell to the first rate and to the second rate before and after activating the additional serving cell, respectively, only if at least one of the criteria is met.

15. The method of claim 8, wherein the feedback information comprises at least one of sounding reference signal (SRS) transmissions and channel state information (CSI) reports.

16. The method of claim 8, wherein the first serving cell is a primary serving cell and the additional serving cell is a secondary serving cell.

17. A network node of a wireless communication system, the network node for detecting that an additional serving cell is activated, the network node configured to support carrier aggregation and to serve a wireless device configured with a first serving cell and the additional serving cell, the network node comprising:
a transceiver;
a processing circuit operatively connected to the transceiver and configured to:
configure the wireless device to transmit feedback information associated with the additional serving cell at a first rate;
transmit, via the transceiver and to the wireless device, a command to activate the additional serving cell;
detect the activation of the additional serving cell based on reception of feedback information from the wireless device;
configure the wireless device to transmit feedback information associated with the additional serving cell at a second rate after activation of the additional serving cell, wherein the second rate is lower than the first rate.

18. The network node of claim 17, wherein the processing circuit is configured to configure the wireless device to transmit feedback information associated with the additional serving cell at the first rate at reception of the command to activate the additional serving cell, or at activation of the additional serving cell.

19. The network node of claim 18, wherein the processing circuit is configured to configure the wireless device to transmit feedback information associated with the additional serving cell at the second rate by configuring the wireless device to transmit feedback information associated with the additional serving cell at the first rate during a defined period of time after which feedback information is to be transmitted at the second rate.

20. The network node of claim 17, wherein the processing circuit is configured to configure the wireless device to transmit feedback information associated with the additional serving cell at the second rate at or after detecting the activation of the additional serving cell.

21. The network node of claim 17, wherein the processing circuit is configured to:
receive, via the transceiver and from the wireless device, a capability indicating whether the wireless device is capable of autonomously adjusting a rate for transmitting feedback information associated with the additional serving cell at activation of the additional serving cell;
determine whether to configure the wireless device to transmit feedback information associated with the additional serving cell at the first rate and at the second rate before and after activation of the additional serving cell, respectively, based on the received capability.

22. The network node of claim 21, wherein the processing circuit is configured to, when the received capability indicates that the wireless device is capable of autonomously adjusting the rate for transmitting feedback information:
determine not to configure the wireless device to transmit feedback information associated with the additional serving cell at the first rate and at the second rate before and after activation of the additional serving cell respectively;
transmit, via the transceiver and to the wireless device, information defining the first and the second rate for enabling the wireless device to autonomously adjust the rate for transmitting feedback information at activation of the additional serving cell.

23. The network node of claim 21, wherein the processing circuit is configured to:
determine whether at least one of following criteria is met:
that intra-band contiguous carrier aggregation is configured;
that the additional serving cell is collocated with the first serving cell of the network node;
that a measurement report for the additional serving cell before activation is available; and
that radio characteristics of the radio environment for the wireless device are stable since reception of the wireless device measurement report for the additional serving cell;
configure the wireless device to transmit feedback information associated with the additional serving cell at the first rate and at the second rate before and after activation of the additional serving cell, respectively, only if at least one of the criteria is met.

24. A wireless device for enabling detection of activation of an additional serving cell by a network node of a wireless communication system supporting carrier aggregation, the network node serving the wireless device, the wireless device configured with a first serving cell and the additional serving cell, the wireless device comprising:
a transceiver;
processing circuit operatively connected to the transceiver and configured to:
receive, via the transceiver and from the network node, a command to activate the additional serving cell;
in response to the received command:
adjust a rate for transmitting feedback information associated with the additional serving cell to a first rate; and
activate the additional serving cell;
adjust the rate for transmitting feedback information associated with the additional serving cell to a second rate, after activating the additional serving cell, wherein the second rate is lower than the first rate.

25. The wireless device of claim 24, wherein the processing circuit is configured to receive information defining the first rate and the second rate from the network node via the transceiver.

26. The wireless device of claim 24, wherein the processing circuit is configured to adjust the rate to the second rate when a period of time has lapsed from activation of the additional serving cell.

27. The wireless device of claim 26, wherein the processing circuit is configured to receive information defining the period of time from the network node via the transceiver.

28. The wireless device of claim 24, wherein the processing circuit is configured to:
receive, via the transceiver and from the network node, a configuration to transmit feedback information associated with the additional serving cell at the second rate;
adjust the rate for transmitting feedback information to the second rate in response to the received configuration.

29. The wireless device of claim 24, wherein the processing circuit is configured to transmit a capability via the transceiver to the network node, the capability indicating that the wireless device is capable of autonomously adjusting the rate for transmitting feedback information associated with the additional serving cell at activation of the additional serving cell.

30. The wireless device of claim 24, wherein the processing circuit is configured to:
determine whether at least one of following criteria is met:
that intra-band contiguous carrier aggregation is configured;
that the additional serving cell is collocated with the first serving cell of the network node;
that a time period between performing a measurement for the additional serving cell and reception of the command from the network node to activate the additional serving cell is shorter than a threshold; and
that radio characteristics of the radio environment for the wireless device are stable since performing the measurement for the additional serving cell;
adjust the rate for transmitting feedback information associated with the additional serving cell to the first rate and to the second rate before and after activating the additional serving cell respectively, only if at least one of the criteria is met.

* * * * *